US007437676B1

(12) United States Patent
Magdum et al.

(10) Patent No.: US 7,437,676 B1
(45) Date of Patent: Oct. 14, 2008

(54) METHODS AND APPARATUS FOR MANAGING NETWORK RESOURCES VIA USE OF A RELATIONSHIP VIEW

(75) Inventors: Zakir G. Magdum, Shrewsbury, MA (US); Kenneth E. Fickie, Ashland, MA (US); Hanna Yehuda, Newton, MA (US)

(73) Assignee: EMC Corporation, Hopkinton, MA (US)

( * ) Notice: Subject to any disclaimer, the term of this patent is extended or adjusted under 35 U.S.C. 154(b) by 714 days.

(21) Appl. No.: 10/675,586

(22) Filed: Sep. 30, 2003

(51) Int. Cl.
*G06F 3/00* (2006.01)
(52) U.S. Cl. .................. 715/738; 715/735; 715/736; 715/737; 715/739
(58) Field of Classification Search ......... 715/730–745; 345/734
See application file for complete search history.

(56) References Cited

U.S. PATENT DOCUMENTS 6,788,315 B1 *  9/2004  Kekic et al. ................. 715/733

2004/0051731 A1 *  3/2004  Chang et al. ................ 345/734
2004/0075680 A1 *  4/2004  Grace et al. ................. 345/734
2004/0243945 A1 * 12/2004  Benhase et al. ............. 715/853

* cited by examiner

*Primary Examiner*—Peng Ke
(74) *Attorney, Agent, or Firm*—Chapin IP Law, LLC; Barry W. Chapin, Esq.

(57) ABSTRACT

A processing device generates a relationship view of managed entities in a storage area network based on objects stored in a relational database. Each managed entity (e.g., file system, database, volume, storage device, etc.) in the storage area network has a corresponding managed object stored in the relational database. Generally, managed objects of a particular type are categorized into one or more tables. Such tables are related to one another by foreign key attributes, which represent relationships between types of managed objects (and thus a relationship between corresponding managed entities). Relationships among the managed objects in the relational database may be generally classified as either association or containment. Association identifies a logical relationship between managed objects. Containment identifies groups of managed objects that are logically associated with each other. The processing device uses these identified relationships to generate the appropriate relationship view for a selected managed entity.

53 Claims, 13 Drawing Sheets

METHODS AND APPARATUS FOR MANAGING NETWORK RESOURCES VIA USE OF A RELATIONSHIP VIEW

BACKGROUND OF THE INVENTION

Certain conventional computer devices include Graphical User Interfaces (GUI) that enable network managers to graphically manage, control and configure various types of hardware and software resources associated with a corresponding managed storage area network. In one conventional application, a network management application rendering the graphical user interface enables the network manager to graphically select, interact with, and manage local or remote devices and associated software processes operating in the storage area network. More specifically, based on use of the graphical user interface in combination with an input device such as a hand operated mouse and corresponding pointer displayed on a viewing screen, a network manager is able to manage hardware and software entities such as file systems, databases, storage devices, peripherals, network data communications devices, etc. associated with the storage area network. Typically, in such network management applications, the network manager selects a displayed icon representing a corresponding resource in the network and applies management commands to a selected icon to carry out intended management functions.

Many conventional network management applications are designed to generate a topological view or visual representation of a layout of managed hardware resources in a storage area network. For example, a network may include a number of hardware devices such as servers, data communications devices (e.g., switches, routers, etc.), network attached storage devices, proxy devices, firewall devices, and so forth that are coupled amongst each other via physical cables. A conventional management application typically provides access to a database that contains data structures describing and defining how these hardware resources are interconnected with each other within the network. The management application uses this information in the database to render a graphical display of the networked devices as individual icons coupled to each other with lines that represent physical data communications links.

SUMMARY OF THE INVENTION

Conventional network management software applications that graphically display physical connectivity among network resources suffer from a variety of deficiencies. For example, conventional network management software applications do not uniformly present network topology views in a consistent and optimal manner across all hosts, database and storage platforms for ease of use by a user of such software applications. More specifically, conventional network management applications that attempt to render a relationship view of managed hardware and software entities in a storage area network either randomly place representations of resources, such as icons, in a graphical view along with lines to illustrate relatedness to a network manager. This conventional technique for displaying a network topology or interconnection of manageable network resources suffer from deficiencies due in large part to a lack of ergonomic considerations. For example, users typically have a limited ability to visually scan, identify, select and then apply management display commands to specific manageable network resources of interest using conventional network views and supported display functions. That is, conventional relationship views of managed entities render it difficult (e.g., sometimes due to high density of icons and corresponding relationships) for a user to identify and then select particular managed resources of interest in a network due to the complex graphical layouts that such conventional applications provide. Furthermore, conventional applications fail to support user friendly management display functions to manage entities that enhance a GUIs usefulness.

Embodiments of the invention significantly overcome the aforementioned and other deficiencies of conventional network display and management systems. In particular, embodiments of the invention provide mechanisms and techniques for visually displaying managed entities of a network and their relationship to each other on a display of a computer device. The computer device may be, for example, a network management workstation that supports embodiments of the invention includes a management software application that presents, during runtime, a graphical user interface including a relationship view (i.e., a visual representation of various elements in a SAN represented by icons and other relationship symbols) of managed entities associated with a network such as a storage area network. Relationship views may be presented to a user such as a network manager to convey relationships among software and hardware entities of the storage area network. Certain embodiments of the invention include network management software incorporating the functionality explained herein, as well as computerized devices configured to operate as explained herein.

In a specific embodiment of the invention, a processing device generates a relationship view including managed entities associated with a storage area network based on objects stored in a relational database. For example, a management database tracks relationships among the managed entities (e.g., hardware and software entities such as host servers, storage devices, file systems, databases, volumes, etc.) via use of corresponding managed objects.

Each managed entity in the storage area network may have a corresponding managed object stored in the relational database. Generally, managed objects of a particular type are categorized into one or more tables. The tables are related to one another by foreign key attributes (e.g., references), which represent or identify relationships between types of managed objects (and thus a relationship between corresponding managed entities). Relationships between the managed objects in the relational database may be generally classified as either association or containment. Association identifies a logical relationship between managed objects. Containment identifies one or more objects that form a logical grouping. For example, containment (e.g., parent-child relationship) may identify a set of similar types of managed entities such as a group of databases. Also, containment may identify that a group of certain hardware and/or software entities are associated with, for example, a particular managed entity such as a host server device.

In general, icons displayed in a relationship view depict corresponding managed entities of a storage area network. When displayed in the relationship view, associations (e.g., relationships) between icons are delineated by relationship paths such as lines extending between icons. Containment in a relationship view may be depicted as a single box or nested sets of boxes encompassing a group or groups of displayed icons representing a logical grouping of related managed entities (displayed as icons) in the storage area network. Thus, a box or container may represent a computer device such as a host server (e.g., a managed entity) of a storage area network; the corresponding icons in the box or container may represent other managed entities (e.g., databases, file systems, volumes, groups of volumes, host devices, etc.) contained in or associated with the host server.

In one embodiment, activating an expand function associated with an icon displayed in a relationship view results in an expansion of that relationship view. An expanded relationship view may include more specific details such as additional relationships between newly displayed icons (e.g., related but previously hidden managed entities) associated with the expanded icon and corresponding previously displayed neighboring icons. In other words, a user may click on an icon representing a database in a relationship view to display otherwise hidden details associated with the corresponding database. In one example, a user may choose to expand a relationship view or, more particularly, a database icon (representing a corresponding database in the managed network) so that the relationship view further includes detailed relationship paths between a database schema, table space and database files (all of which are sub-details of the database icon) instead of merely displaying a high level relationship between a single database icon associated with a host server of the storage area network and a corresponding storage disk of the storage area network.

Accordingly, more general embodiments of the invention include graphically displaying a relationship view in response to a user input. For example, a processing device may receive an identity of a selected managed entity (e.g., a managed entity such as a hardware or software entity selected by a user such as a network manager) existing in a storage area network for which the user would like to view related managed entities in a relationship view. In response to receiving the identity of the selected managed entity, the processing device retrieves a first managed object from a management database that corresponds to the selected managed entity. The database also includes managed objects associated with other managed entities in the network. Based on processing of information in the first managed object and retrieval and processing of other related managed objects in the management database, the processing device identifies a sequence of relationships between the selected managed entity and other managed entities in the storage area network.

Identification of the sequence of relationships (or a portion thereof) between the selected managed entity and other managed entities enables the processing device to generate and graphically display a relationship view of the selected managed entity and at least one other managed entity of the storage area network based on use of columns of icons. For example, a first column in the relationship view may include at least one icon graphically representing a managed host entity. A second column of the relationship view may include at least one icon graphically representing a managed storage entity. At least a portion of the sequence of relationships between the managed entities are graphically represented by relationship paths between the at least one icon in the first column and the at least one icon in the second column.

In further embodiments and potentially other independent embodiments, the processing device maintains a management database of objects identifying relationships between the managed entities via collection of information (e.g., configuration information, connectivity information, etc.) from agents distributed throughout the storage area network. Based on receipt of configuration data (such as logical association information) from the agents, the management database may be updated at least occasionally to reflect relationships between previously existing and newly created hardware and software type entities associated with the storage area network. One purpose of tracking the relationships, as discussed, is to support generation of relationship views of managed entities in a storage area network.

Selection of which managed entity to display in the relationship view may depend on input from a user such as a network manager overseeing a corresponding storage area network. In one application, a vertical hierarchy of managed entities (e.g., s logical hierarchy of databases, file systems, volumes, ports, storage devices, etc.) is presented to a viewer on at least a portion of a display screen. To select which managed entity to include in a relationship view on the display screen, the viewer (e.g., a network manager) clicks on the icon itself or a selectable input field disposed in relation to entries of the vertical hierarchy displayed on the display screen. In response to detecting selection of a particular entry (e.g., a managed entity) listed in the vertical hierarchy, the processing device associated with the GUI generates the first relationship view from the perspective of the selected managed entity.

In an illustrative embodiment, the processing device generates a relationship view by first receiving an identity of the selected managed entity existing in the storage area network. The processing device then retrieves a managed object from the management database that corresponds to the selected managed entity. The processing device then identifies and retrieves objects related to the retrieved managed object associated with the selected managed entity for storage in data structures. Based on processing of the data structures and, more specifically, references such as foreign keys associated with the managed object, the processing device identifies (a sequence of) relationships between the selected managed entity and other managed entities in the network. For example, a first managed object (corresponding to the selected managed entity) may include a reference to a second managed object (corresponding to a second managed entity related to the selected managed entity). The second managed object may include a reference to a third managed entity, and so on. In this way, the references represent a sequence of relationships between the managed objects and corresponding managed entities.

In a specific embodiment, the processing device utilizes information such as references in a managed object associated with a host server (i.e., a managed entity) to identify one or multiple corresponding databases (i.e., another managed entity and object) associated with the host server. Managed objects associated with the one or multiple corresponding databases may include further references (e.g., foreign keys) to identify sub-parts of the database.

As mentioned, identification of a sequence of relationships between managed entities (or a portion of the sequence of relationships) enables the processing device to generate and graphically display a relationship view of the selected managed entity and at least one other managed entity of the storage area network based on use of columns of icons and corresponding relationship paths. For example, as discussed, a first column in a relationship view may include at least one icon graphically representing a managed software entity. A second column of the relationship view may include at least one icon graphically representing a managed storage entity. The processing device displays at least a portion of the sequence of relationships between managed entities via relationship paths between the at least one icon in the first column and the at least one icon in the second column.

In one embodiment, the processing device generates a horizontally disposed relationship view of adjacently positioned columns including multiple icons and corresponding relationship paths from the perspective of an icon associated with the selected managed entity. Presenting adjacent columns of icons enables the viewer to quickly identify a group of similar types of managed entities in the storage area network. Presenting relationship paths between the icons spanning from, for example, an icon representing a software entity (such as a DB schema) to a hardware entity (such as a corresponding storage device) enables the viewer of the relationship view to easily identify managed entities related to the selected managed entity.

In addition to use of icons and corresponding relationship paths to illustrate a sequence of identified relationships, a relationship view may include a container (e.g., a graphical box) encompassing one or multiple icons (or even other containers) to represent another managed entity associated with the storage area network. For example, a container may represent a managed entity such as a database, a group of volumes, a host server, a storage disk, etc. Use of one or multiple containers (or nested containers) in the relationship view along with icons and relationship paths enables the viewer to quickly identify that a group of icons is associated with a particular volume, database, host server, etc.

One display mode associated with a relationship view involves use of a viewer controlled device (such as a computer mouse) to highlight relationship paths displayed in a corresponding relationship view between icons representing managed entities. The viewer controlled device supports movement of a corresponding cursor (such as an arrow icon) on the display screen. In response to detecting that the cursor is in a vicinity of a given relationship path (as selected by the viewer) or that a user clicks on a relationship path, the processing device highlights (bolds, changes color, distinguishes, . . . ) the given relationship path over others also displayed on a display screen. This feature may be extended to highlight icons, containers and other managed entities displayed in the relationship view when a use clicks on such symbols. Consequently, a viewer may easily identify icons at either ends of the highlighted relationship path even in the presence of many densely displayed relationship paths between other neighboring displayed icons.

As briefly discussed above, another display mode supported by an embodiment of the invention enables a viewer to expand or collapse an icon in a corresponding relationship view. For example, a visual region may be allocated in relation to a corresponding icon to receive input commands such as expand or collapse generated by a user. In response to detecting receipt of an 'expand' command (such as clicking on a plus sign) in the visual region near a corresponding icon, the processing device expands the first relationship view of managed entities in the storage area network into a second relationship view. For example, if a first relationship view includes a first and second column of icons, an expanded relationship view may include additional icons representing other managed entities of the storage area network associated with the expanded managed entity. Conversely, in response to detecting receipt of a 'collapse' command in the visual region near a corresponding icon, the processing device collapses (hides) a view of certain icons associated with the relationship view. Accordingly, a user may select a level of detail associated with a relationship view. In other words, one embodiment of the invention supports a zoom in and zoom out function in the relationship view.

Yet another display mode supported by an embodiment of the invention enables a user to select and display multiple relationship views simultaneously. For example, the processing device may display a first relationship view having a level of detail as selected by a given viewer. From the first relationship view, a user may select a particular icon among many displayed icons and corresponding relationship paths. In response to detecting the user's selection of the particular icon in the first area, the processing device generates a second relationship view in a second area of the display screen. The second relationship view includes a presentation of relationships between a managed entity associated with the particular icon and other associated nearest neighboring managed entities in the storage area network. This display management function enables a user to duplicate a relationship view for the selected entity apart from other unwanted relationship information in the first view. In one embodiment, the processing device generates a second relationship view in response to a user dragging and dropping the particular icon from a first area of the display screen to a second area of a display screen.

Other embodiments of the invention include a computerized device (e.g., a host computer, workstation, etc.) configured to support the aforementioned method operations disclosed herein as embodiments of the invention to provide a relationship view and associated resource management operations. In such embodiments, the computerized device includes a display, a memory system, a processor (e.g., a processing device) and an interconnect. The interconnect supports communications among the display, the processor and the memory system. The memory system is encoded with a resource management application that, when executed on the processor, produces a resource management process that includes a graphical user interface produced on the display of the computerized device. The graphical user interface allows the resource management process to perform all of the method embodiments and operations explained herein as embodiment of the invention.

Yet other embodiments of the invention disclosed herein include software programs to perform the method embodiment and operations summarized above and disclosed in detail below under the heading Detailed Description of Preferred Embodiments. More particularly, a computer program product (e.g., a computer-readable medium) including computer program logic encoded thereon may be executed on a computerized device to support generation and display of relationship views and associated operations as explained herein. The computer program logic, when executed on at least one processor with a computing system, causes the processor to perform the operations (e.g., the methods) indicated herein as embodiments of the invention. Such arrangements of the invention are typically provided as software, code and/or other data structures arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC) or as downloadable software images in one or more modules, shared libraries, etc. The software or firmware or other such configurations can be installed onto a computerized device to cause one or more processors in the computerized device to perform the techniques explained herein as embodiments of the invention. Software processes that operate in a collection of computerized devices, such as in a group of storage area network management servers, can also support embodiments of the invention.

It is to be understood that the system of the invention can be embodied as a software program or as a software program operating in conjunction with corresponding hardware. Example embodiments of the invention may be implemented within EMC's Control Center (ECC) software application that provides graphical management functionality for storage area network resources and in computerized devices that operate the Control Center (ECC) software. Control Center software is manufactured by EMC Corporation of Hopkinton, Mass., USA.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, with emphasis instead being placed upon illustrating the embodiments, principles and concepts of the invention.

DETAILED DESCRIPTION OF PREFERRED EMBODIMENTS

Embodiments of the invention include a processing device that generates a relationship view including managed entities associated with a storage area network based on corresponding objects stored in a relational database. For example, a management database tracks relationships among managed hardware and software entities via use of corresponding managed objects. Each managed entity in the storage area network has a corresponding managed object stored in the relational database. Generally, managed objects of a particular type are categorized into one or more tables. The tables are related to one another by foreign key attributes, which indicate relationships between types of managed objects (and thus a relationship between corresponding managed entities).

Relationships between the managed objects in the relational database may be generally classified as either association or containment. Association identifies a logical relationship between managed objects. Containment identifies one or more objects that form a logical grouping.

In general, icons displayed in a relationship view depict corresponding managed entities of a storage area network. Each icon displayed in the relationship view is backed by a record associated with a table mapped to a managed object class. In the relationship view, associations (e.g., relationships) between icons are delineated by relationship paths such as lines extending between icons. Containment in a relationship view may be depicted as a single box or nested sets of boxes encompassing a group of displayed icons. A box displayed in a relationship view represents a logical grouping of related managed entities (displayed as icons) in the storage area network. Thus, a box or container may represent a device such as a host server of a storage area network; the corresponding icons in the box may represent other managed entities (e.g., data bases, file systems, volumes, groups of volumes host devices, storage devices, etc.) associated with the host server. Use of the relationship view enables a network manager to visually analyze relationships between software and hardware entities in the storage area network and, thus, make appropriate network management decisions based on evolving client needs.

Figure 1:
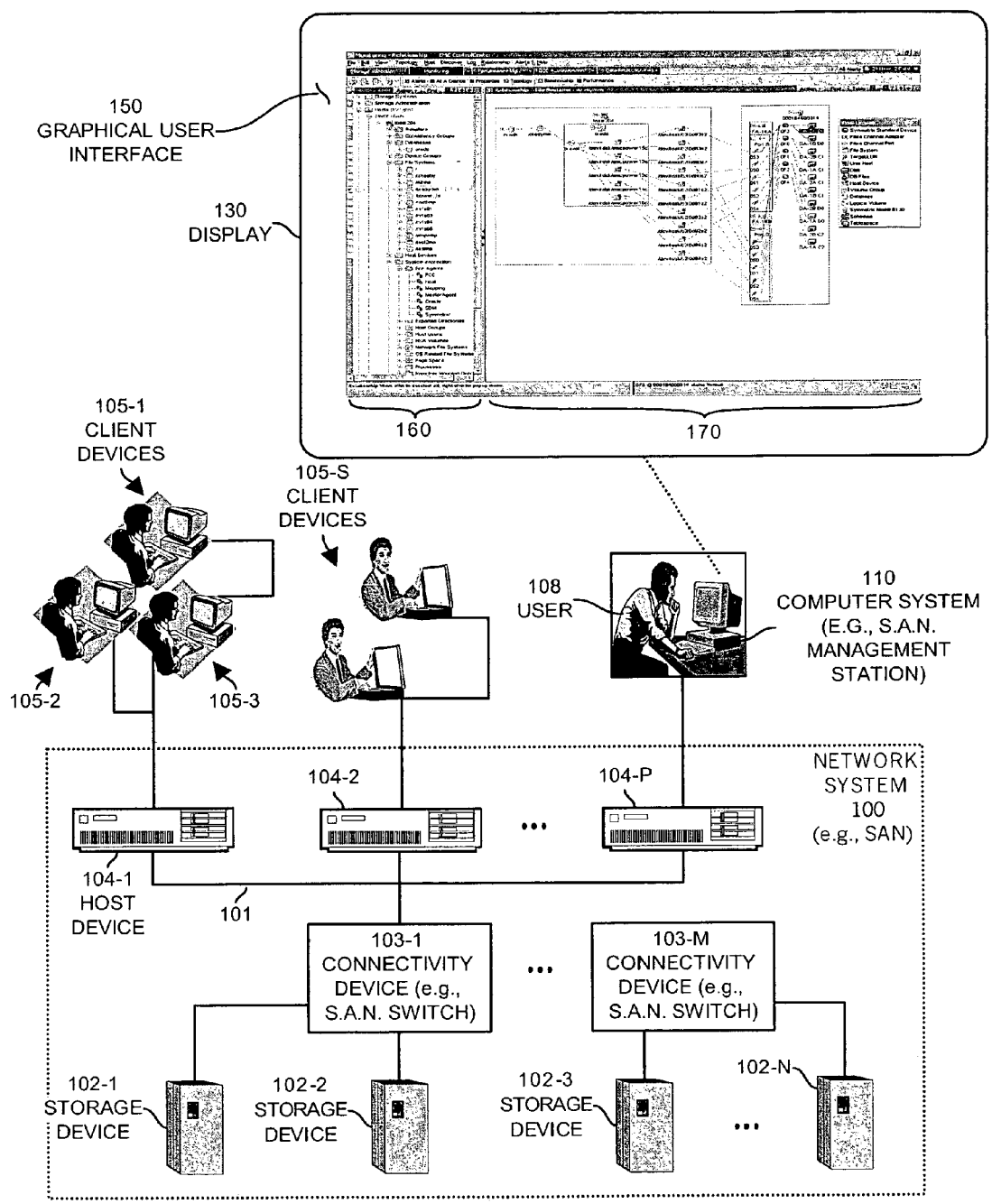
FIG. 1 is a pictorial diagram of a storage area network and management station configured to operate according to an embodiment of the invention.

FIG. 1 illustrates a network 100 (e.g., a storage area network) suitable for use in explaining the operation of example embodiments of the invention. As shown, the network 100 includes a network medium 101 such as a high-speed data communications medium (e.g., Ethernet, optical network, or other type of network) that interconnects a plurality of components such as storage devices 102-1, 102-2, . . . 102-N, storage area network switches 103-1, . . . 103-M, host devices (e.g., host servers) 104-1, 104-2, . . . , 104-P, client devices 105-1, 105-2, . . . , 105-S, and computer system 110 (e.g., a storage area network management station).

Computer system 110 is configured, in this example, as a storage area network management station operated by network manager or user 108 (e.g., a user responsible for managing the resources within the storage area network 100). Computer system 110 executes a resource manager 120 (e.g., a software graphical user interface application more particularly shown in FIG. 2) that generates and displays relationship views in accordance with embodiments of the invention as will be explained herein. The resource manager 120 in this example may be any type of network management software application that executes, performs or otherwise operates within the management station computerized system 110. It should be noted that computer system 110 may include certain other components such as one or more internal devices as well as software applications or processes that operate within or in conjunction with the illustrated components and devices in FIG. 1.

As shown towards the top of FIG. 1, and of particular interest to discussion of this invention, the management station computer system 110 is a computer device including corresponding display 130 (e.g., a monitor or other visual display device) generated by resource manager 120 operating to display a graphical user interface 150 as explained herein. User 108 provides input commands to control what relationships are displayed on display 130.

The graphical user interface 150 configured in accordance with embodiments of the invention includes a hierarchical arrangement of icons 160 (e.g., a hierarchy of vertically disposed icons) and a relationship view 170 in designated display areas 170 of display 130. Icons represent managed hardware and software entities associated with network 100. Generally, and as will be explained in more detail shortly, the graphical user interface 150 enables a user 108 of the computer system 110 to select one or more icons from the hierarchical arrangement of icons 160 displayed on the left side of display 130. In response to a selection of an icon associated with a managed entity (e.g., a storage device 102, a database, a host computer, etc.), computer system 110 displays a corresponding relationship view 170. As a brief example, user 108 may select an icon associated with host device 104-1 from the hierarchical arrangement of icons 160. In this instance, computer system 110 will generate a relationship view 170 to include a graphical display of relationships between the selected managed entity (e.g., as represented by the selected icon) associated with host device 104-1 and other related managed entities in network system 100. Based on use of relationship view 170, user 108 is able to quickly ascertain which elements or relationships associated with a selected entity are of interest.

Figure 2:
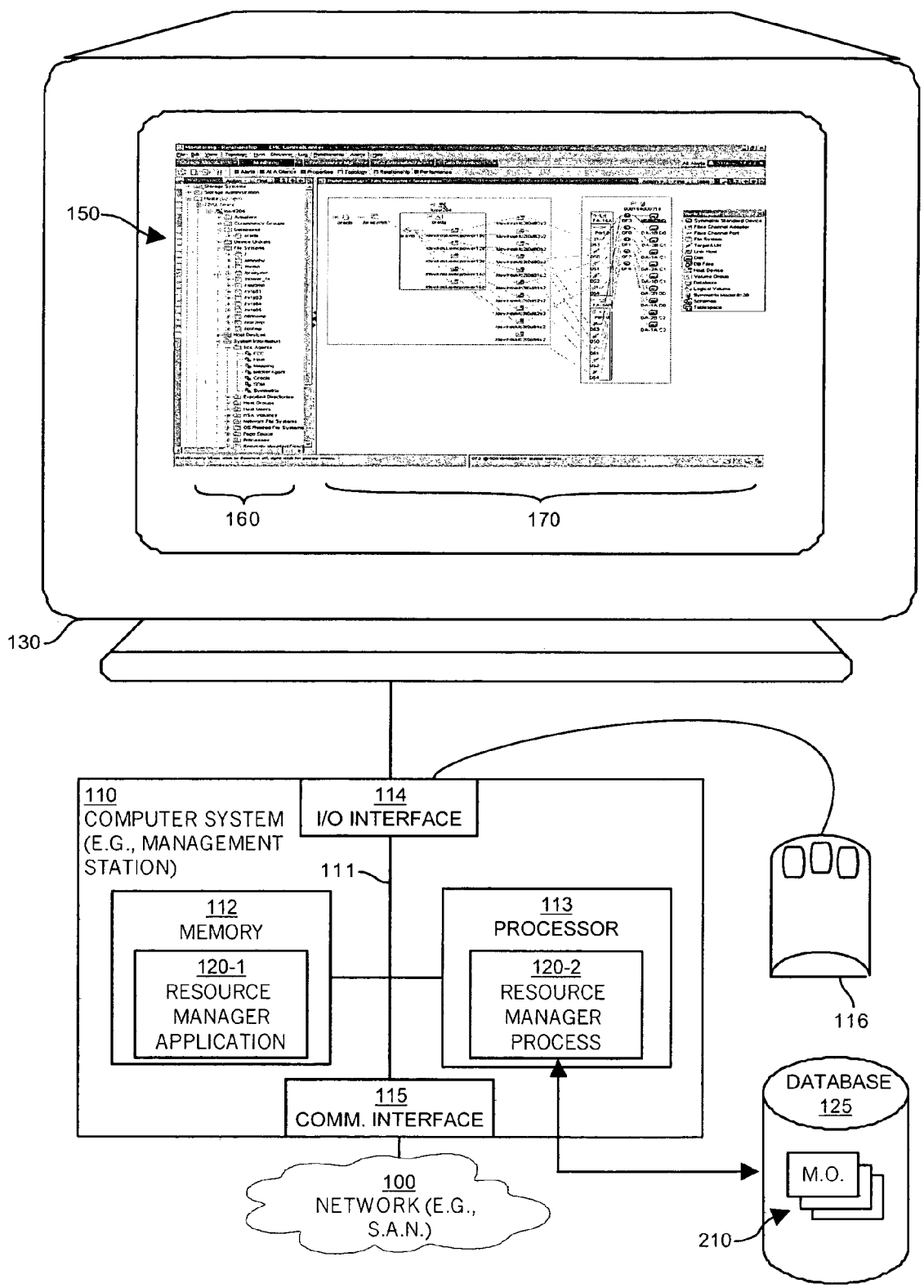
FIG. 2 is a block diagram of a sample architecture associated with the management station in FIG. 1 including a graphical user interface generated according to an embodiment of the invention.

FIG. 2 is a block diagram illustrating an example architecture of computer system 110 (e.g., a storage area network management station) according to embodiments of the invention. Computer system 110 may be a computerized device such as a personal computer, workstation, portable computing device, console, network terminal or the like. As shown, computer system 110 of the present example includes an interconnect 111 that couples a memory system 112, a processor 113, an input/output interface 114 and a communications interface 115. Peripheral device 116 (e.g., one or more viewer controlled devices such as a keyboard, mouse, etc.) couples to processor 113 through I/O interface 114 and enables user 108 to provide input commands and thus generally control display management function of graphical user interface 150 of computer system 110. Database 125 stores managed objects 210 associated with managed entities (e.g., hardware and software entities associated with host devices 104, storage devices 102, etc.) associated with network 100. Communications interface 115 enables computer system 110 (and corresponding user) to communicate with other devices (i.e., resources) associated with network 100.

As shown, memory 112 is encoded with resource manager application 120-1 supporting generation, display and functions associated with one or multiple relationship views 170 on display 130. Resource manager application 120-1 may be embodied as software code such as data and/or logic instructions (e.g., code stored in the memory or on another computer readable medium such as a disk) that supports processing functionality according to different embodiments of the invention as described herein. During operation, processor 113 accesses memory 112 via the interconnect 111 in order to launch, run, execute, interpret or otherwise perform the logic instructions of the resource manager application 120-1. Execution of resource manager application 120-1 produces processing functionality in resource manager process 120-2. In other words, the resource manager process 120-2 represents one or more portions of the resource manager application 120-1 (or the entire application 120-1) performing within or upon the processor 113 in the computerized device 110.

It should be noted that the resource manager 120 executed in computer system 110 is represented in FIG. 2 by either one or both of the resource manager application 120-1 and/or the resource manager process 120-2. For purposes of the discussion of the operation of embodiments of the invention, general reference will be made to the resource manager 120 as performing the various steps and operations to carry out the features of embodiments of the invention.

It should also be noted that embodiments of the invention include the resource manager application 120-1 itself (i.e., the un-executed or non-performing logic instructions and/or data). The resource manager application 120-1 may be stored on a computer readable medium such as a floppy disk, hard disk or in an optical medium. The resource manager application 120-1 may also be stored in a memory type system such as in firmware, read only memory (ROM), or, as in this example, as executable code within the memory system 112 (e.g., within Random Access Memory or RAM). In addition to these embodiments, it should also be noted that other embodiments of the invention include the execution of resource manager application 120-1 in processor 113 as the resource manager process 120-2. Thus, those skilled in the art will understand that the computer system 110 may include other processes and/or software and hardware components, such as an operating system that controls allocation and use of hardware resources.

Display 130 need not be coupled directly to computer system 100. For example, the resource manager 120 can be executed on a remotely accessible computerized device. In this instance, the graphical user interface 150 may be displayed locally to the user, while the resource manager process 120 is executed remotely.

To generate a relationship view 170, the host computer system 110 (e.g., the resource manager process 120-2) accesses information such as managed objects 210 stored in database 125. In one embodiment, computer system 100 accesses information from database 125 using SQL (Structured Query Language).

In general, database 125 contains managed objects 210 corresponding to various hardware and software entities (e.g., database records, tables, data structures, etc.) associated with network 100. In one embodiment, database 125 includes managed objects 210 for each of the followed managed entities:

DATABASE INSTANCE
SCHEMA
DATABASE
TABLESPACE
FILE
FILE GROUP
HOST
FILE SYSTEM
LOGICAL VOLUME
VOLUME GROUP
HOST DEVICE
VM DISK
STORAGE
DISK
DEVICE
PORT
DIRECTOR
PATH LINK
DEVICE GROUP (E.G., SYMMETRIX)
STORAGE GROUP (E.G., CLARION)
NAS
DISK VOLUME
SLICE
GROUPED VOLUME
FILE SYSTEM
SERVER
MOUNT POINT

More details of the managed objects will be discussed in connection with FIG. 3.

General functionality supported by computer system 110 according to embodiments of the invention will now be discussed with respect to flowchart 300 in FIG. 3 as briefly discussed above with respect to FIGS. 1 and 2.

Figure 3:
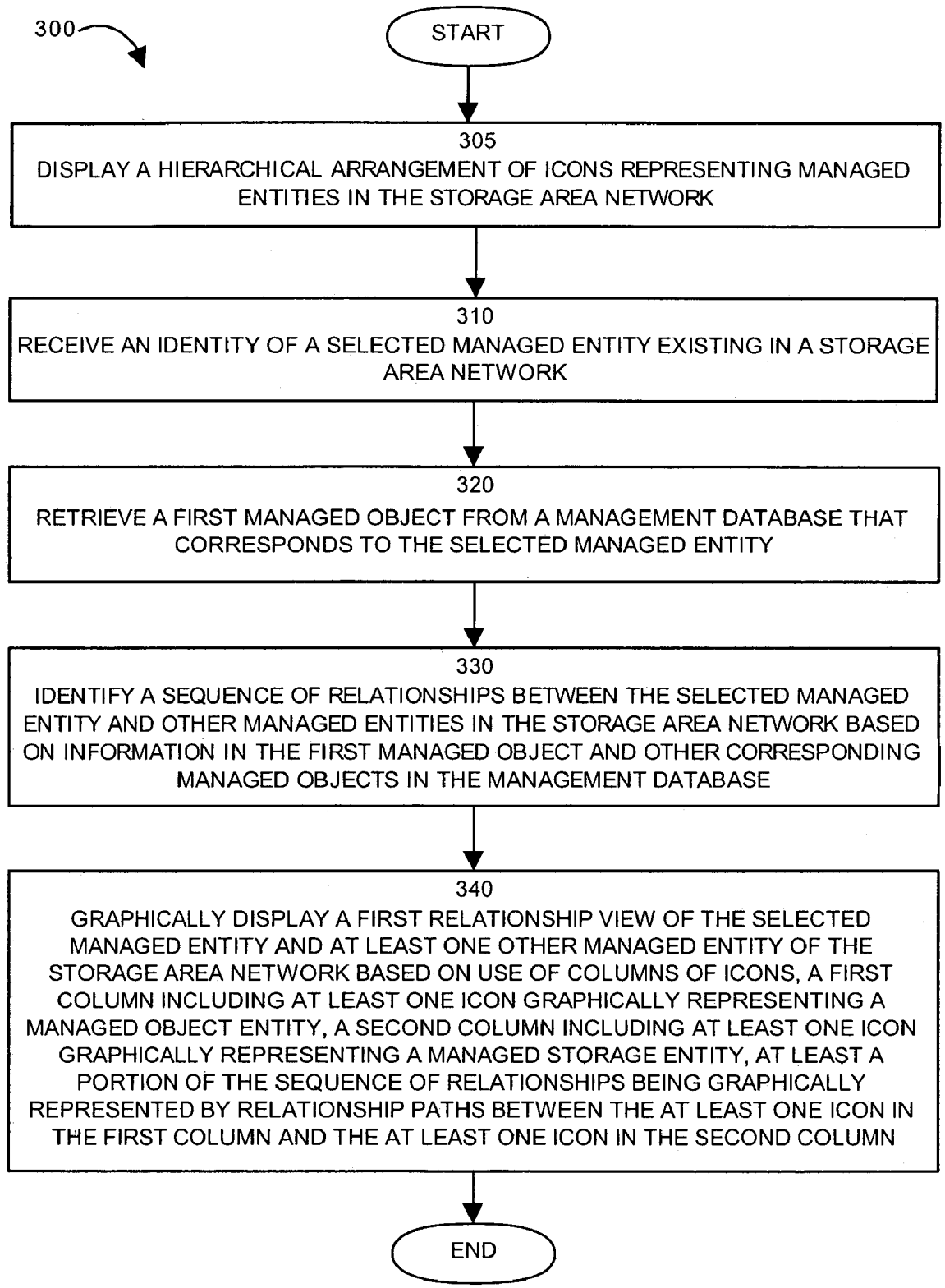
FIG. 3 is a flowchart for generating a relationship view according to an embodiment of the invention.

FIG. 3 is a flowchart 300 of processing steps performed by resource manager 120 according to an embodiment of the invention. In general, flowchart 300 illustrates how resource manager 120 enables user 108 of the management station computer system 110 to display relationship view 170 associated with a selected managed entity of network 100 on display 130. As its name suggests, relationship view 170 graphically illustrates relationships (e.g., device mapping) among various applications, hosts and storage elements of network 100. Note that the discussion of FIG. 3 will occasionally reference the relationship view 170 in FIG. 4 to illustrate embodiments of the invention.

In step 305 of FIG. 3, the resource manager 120 displays a hierarchical arrangement of icons 160 associated with managed entities (e.g., host elements, storage elements and connectivity elements) maintained in network 100. For example, as illustrated in the screenshot 400 in FIG. 4, the resource manager 120 (e.g., via processor 113) vertically displays the hierarchical arrangement of icons 160 on the left-hand side of the display 130 displaying screenshot 400. Generally, the hierarchical arrangement of icons 160 is a collection of individual icons that may be expanded and collapsed in a tree-like manner when a user clicks on an en selection or when the user clicks on the + and – symbols 411 adjacent to each selectable entry 415. A user 108 may select a top-level element category icon such as the 'hosts (by type)' icon (in hierarchical display of icons 160) for expansion in order to view a list of individual host elements representing specific host devices 104 or groups of host devices operating in the storage area network 100. In this example, the 'losat204' icon represents a UNIX host device 104 in network 100. Each top-level or parent category of elements identified by a + sign symbol 411 may be expanded to expose or display the list of related elements below that top-level category in the managed resource or managed entity expressed by a corresponding icon in the hierarchical arrangement of icons 160.

In step 310, resource manager 120 (e.g., processor 113) of computer system 110 receives an identity of a selected managed entity (e.g., a selectable entry 415 such as a hardware or software entity listed in hierarchical arrangement of icons 160) existing in a storage area network 100 for which the user 108 would like to view at least corresponding related managed entities associated with the selected managed entity in a relationship view 170 on display 130. For example, a user 108 may select an entry 415 by checking a corresponding user input checkbox 418 (e.g., a visual region or field to receive input commands from a user 108) or by dragging and dropping an icon such as orasymm icon of hierarchical arrangement of icons 160 into an initially empty relationship view 170 of display 130. By further expanding on an initial relationship view 170 based on clicking on + signs associated with icons, the user 108 may expand relationship view 170 to include additional relationship details associated with each expanded managed entity.

Note that the user 108 may optionally select one or more of such entries 415 or a single entry 415 from the hierarchical arrangement of icons 160 when implementing the relationship view display function. In one embodiment, an entry 415 is highlighted (to identify that it has been selected) after a user 108 clicks on a corresponding input checkbox 418. Clicking on the input checkbox 418 again will deselect the managed entity.

In response to receiving the identity of the selected managed entity from user 108 in step 310, the processor 113 executing resource manager 120 retrieves a managed object 210 from database 125 that corresponds to the selected managed entity in step 320. As discussed, the database 125 also includes managed objects 210 associated other potentially related managed entities in network 100.

In step 330, the processor 113 identifies a sequence of relationships between the selected managed entity (e.g., orasymm under file systems) and other managed entities in the storage area network 100 based on processing of information in the retrieved managed object 210. References (e.g., foreign key attributes) in the retrieved managed object 210 identify other managed objects 210 in (relational) database 125 associated with the selected managed entity. For example, each managed entity 415 listed in hierarchical arrangement of icons 160 has an associated managed object 210 stored in database 125. As discussed, managed objects 210 in database 125 of a particular type are categorized into one or more tables. The tables are related to one another by references (e.g., foreign key attributes), which represent or identify relationships between types of managed objects. The relationships are generally classified into two basic types of business logic: containment and association.

Figure 4:
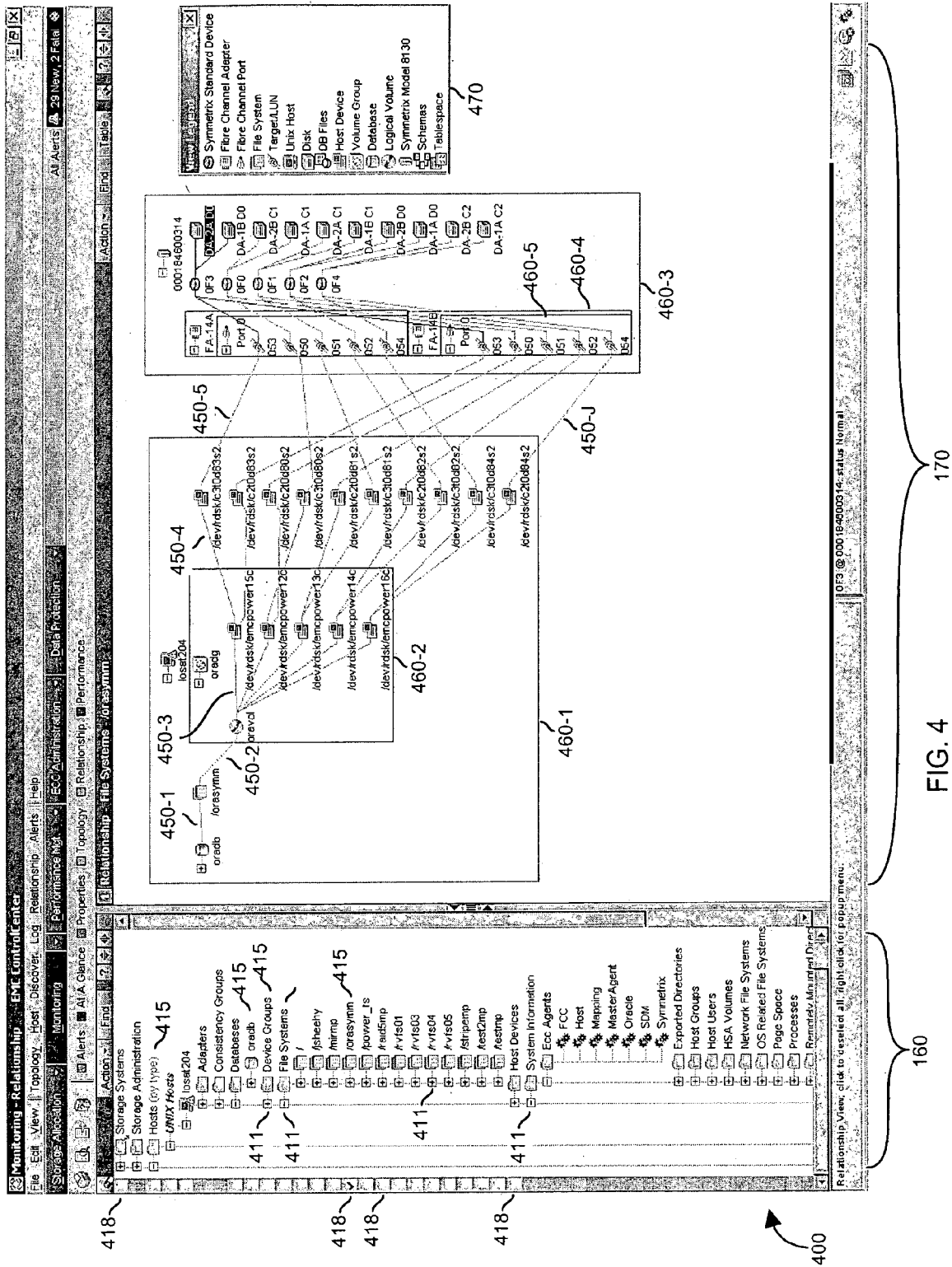
FIG. 4 is a screenshot of a relationship view and vertical hierarchy of icons according to an embodiment of the invention.

Based on use of references such as foreign keys in the tables, resource manager 120 identifies the sequence of relationships (e.g., containment and/or associations) between the selected managed object and other managed objects in the database. As shown in FIG. 4, a user 108 may select orasymm icon in hierarchical arrangement of icons 160 for generating a corresponding relationship view 170 associated with the orasymm file system on display 130. As mentioned, resource manager 120 utilizes references such as foreign key attributes in the managed object 210 in database 125 associated with the orasymm icon entry 415 to identify a mapping to other related managed entities (e.g., oradb, oravol, oradg, etc.) in network 100.

In one embodiment, selection of a particular managed entity does not mean that it will initially be displayed in a corresponding relationship view 170 on display 130. For example, user 108 may select the orasym icon in hierarchical arrangement of icons 160 to generate a corresponding relationship view 170. Such a relationship view 170 may initially include an icon representing the host losat204 and corresponding + sign with one or more relationship paths 450 from the losat204 icon to a storage entity icon such as 000184600314 and corresponding + sign. The corresponding relationship path 450 indicates that host server such as host device 104 has associated information physically stored in storage device 102 represented by 000184600314 icon. User 108 may click on corresponding + signs of icons to expand a relationship view 170 into more details including an icon for orasymm file system. FIG. 4 illustrates a relationship view 170 after losat204 icon, oradg icon, etc. have been expanded.

View legend 470 in FIG. 4 is available so that a user 108 may identify what each of the icons represents. For example, the icon for orasymm in relationship view 170 indicate that it is a file system. The icon for oradb in relationship view 170 indicates that it is a database, and so on.

Identification of the relationships between managed objects 210 and thus corresponding managed entities in step 330 enables the resource manager 120 to generate and graphically display a relationship view 170 of the selected managed entity and other managed entities of the storage area network

100. For example, different relationships between and among entities are represented by relationship paths 450 and containers 460 (i.e., graphical boxes encompassing one or more icons displayed in the relationship view 170) in step 340.

Displaying a relationship view 170 associated with a selected managed entity according to embodiments of the invention enables a user 108 viewing the graphical user interface 150 to visually analyze respective groups of related devices and, in particular, a mapping between, for example, a host device 104 (e.g., as represented by container 460-1) and corresponding storage device 102 (e.g., as represented by container 460-3). As shown in screenshot 400 of FIG. 4, the relationship view 170 extends from left to right to enable the user 108 to quickly identify related managed entities (e.g. hardware and software resources) associated with the storage area network 100. Presenting adjacent columns of icons enables the user 108 to quickly identify groups of similar types of managed entities in the storage area network 100. Presenting relationship paths between the icons spanning from, for example, an icon representing a software entity (such as a database represented by oradb icon) to a hardware entity (such as a corresponding storage device 102) enables the viewer of the relationship view 170 to easily identify managed entities related to the selected managed entity 'orasymm'. For example, as shown, orasymm file system is stored in logical volume oravol. Logical volume oravol comprises five host devices, namely, /dev/rdsk/emcpower15c, /dev/rdsk/emcpower12c, /dev/rdsk/emcpower13c, /dev/rdsk/emcpower14c, and /dev/rdsk/emcpower16. In a similar way, additional relationship paths 450 continue from the host devices to ports of a corresponding fiber channel adapter an so on to corresponding disks.

In addition to use of icons and corresponding relationship paths 450 to identify a sequence of relationships, a relationship view 170 may include one or multiple containers 460 (e.g., graphical boxes) encompassing one or multiple icons to represent different managed entities associated with the storage area network 100. For example, a container 460 may represent a managed entity such as a database, a volume group, a host server, and/or a storage disk associated with network 100. In the relationship view of screenshot 400, container 460-1 represents a host, container 460-2 represents a volume group, container 460-3 represents a storage device, container 460-4 represents a fiber channel adapter, and container 460-5 represents a fiber channel port. Use of one or multiple containers 460 (or nested containers) in the relationship view 170 along with icons and relationship paths 450 enables the viewer to quickly identify that a group of icons is associated with a particular volume, database, host server, etc. For example, volume group represented by 'oradg' includes logical volume 'oravol' and associated devices.

Figure 7:
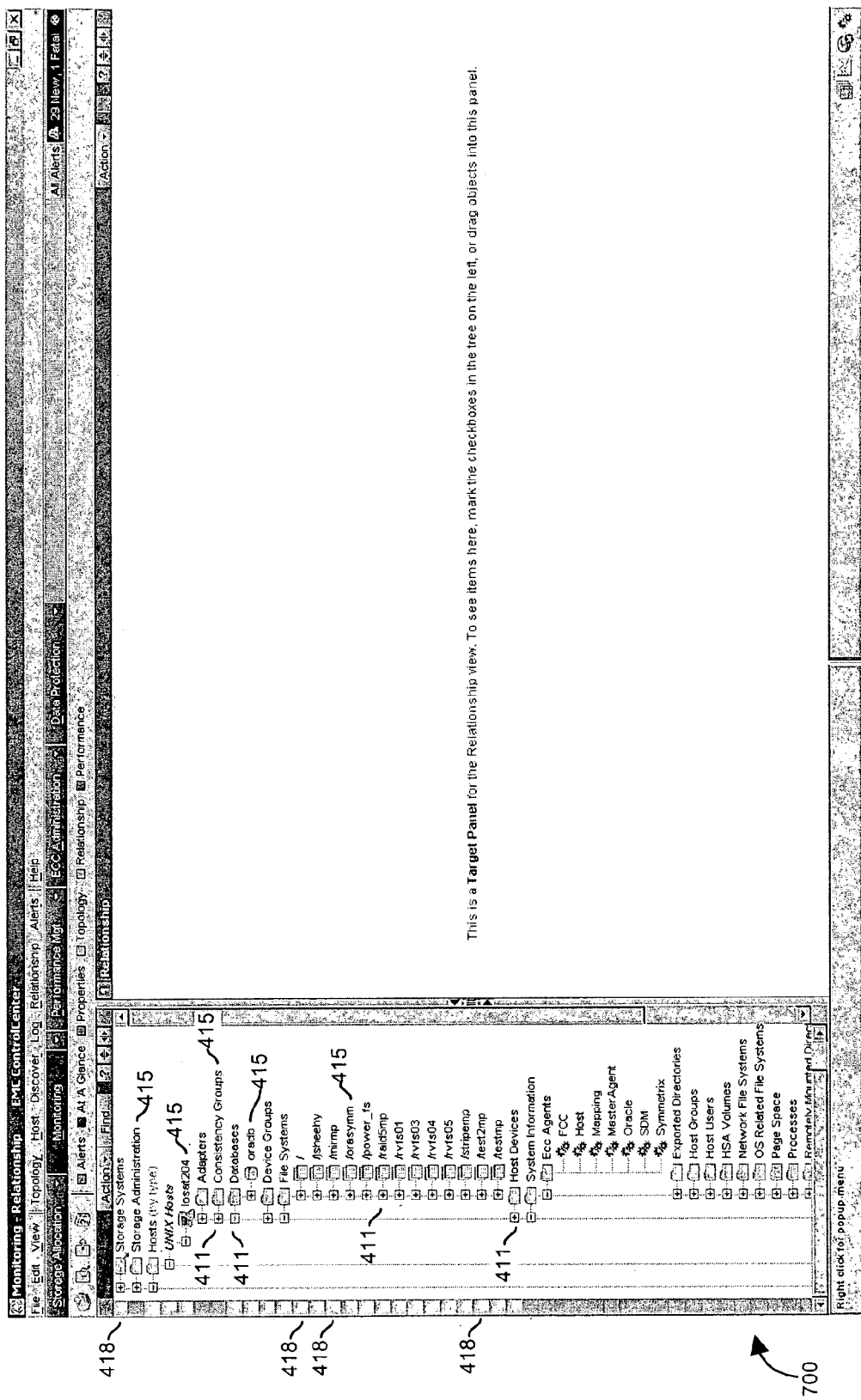
FIG. 7 is a screenshot of a display screen prior to selection of a managed entity according to an embodiment of the invention.
Figure 8:
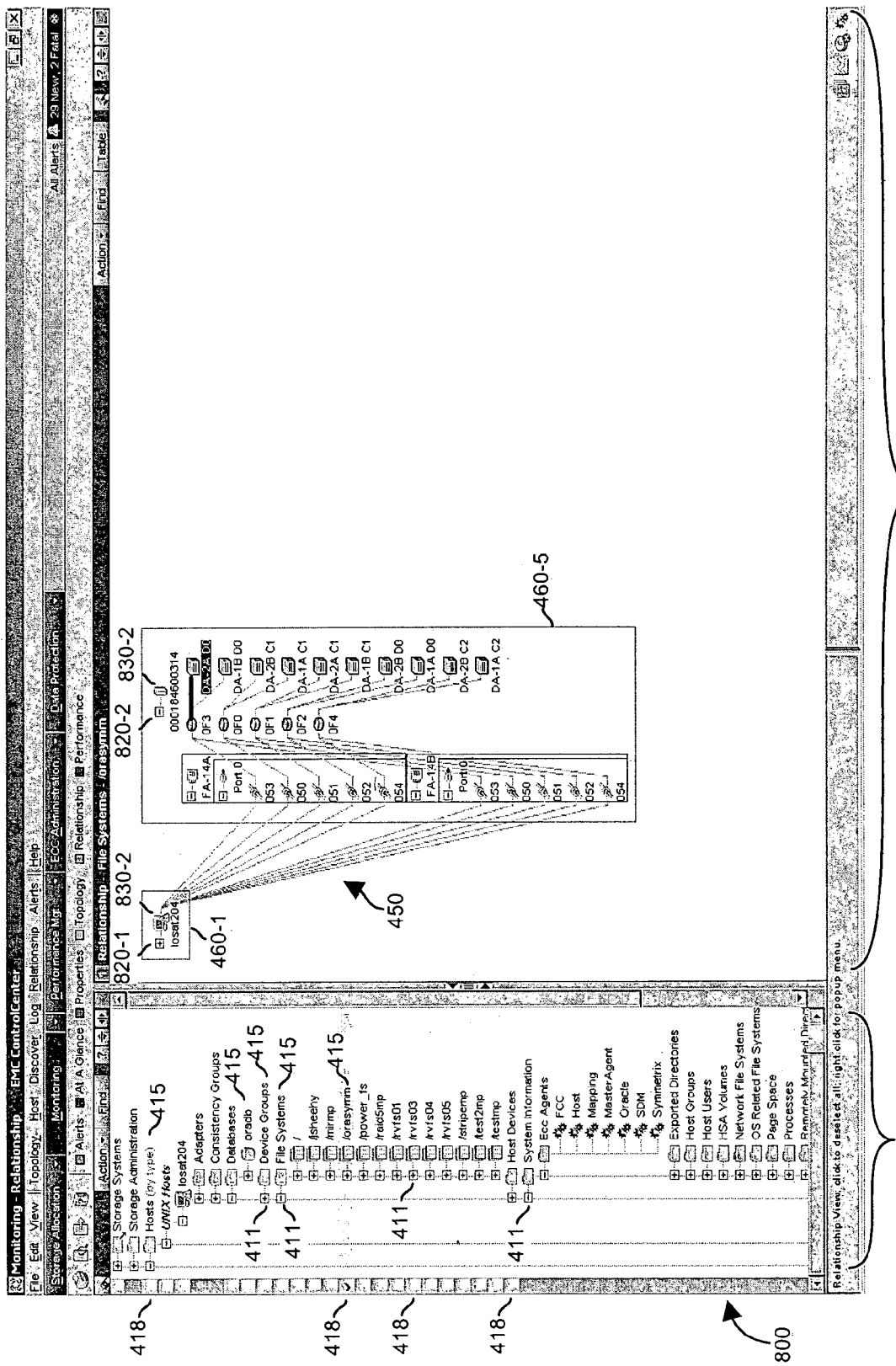
FIG. 8 is a screenshot of an expanded relationship view after selection of a managed entity according to an embodiment of the invention.

Additional functionality supported by computer system 110 and resource manager 120 according to embodiments of the invention will now be discussed with respect to flowchart 500 in FIGS. 5 and 6 and related screenshot 700 in FIG. 7 and screenshot 800 in FIG. 8. Note that flowchart 500 includes certain functionality described in flowchart 300 of FIG. 3.

Figure 5:
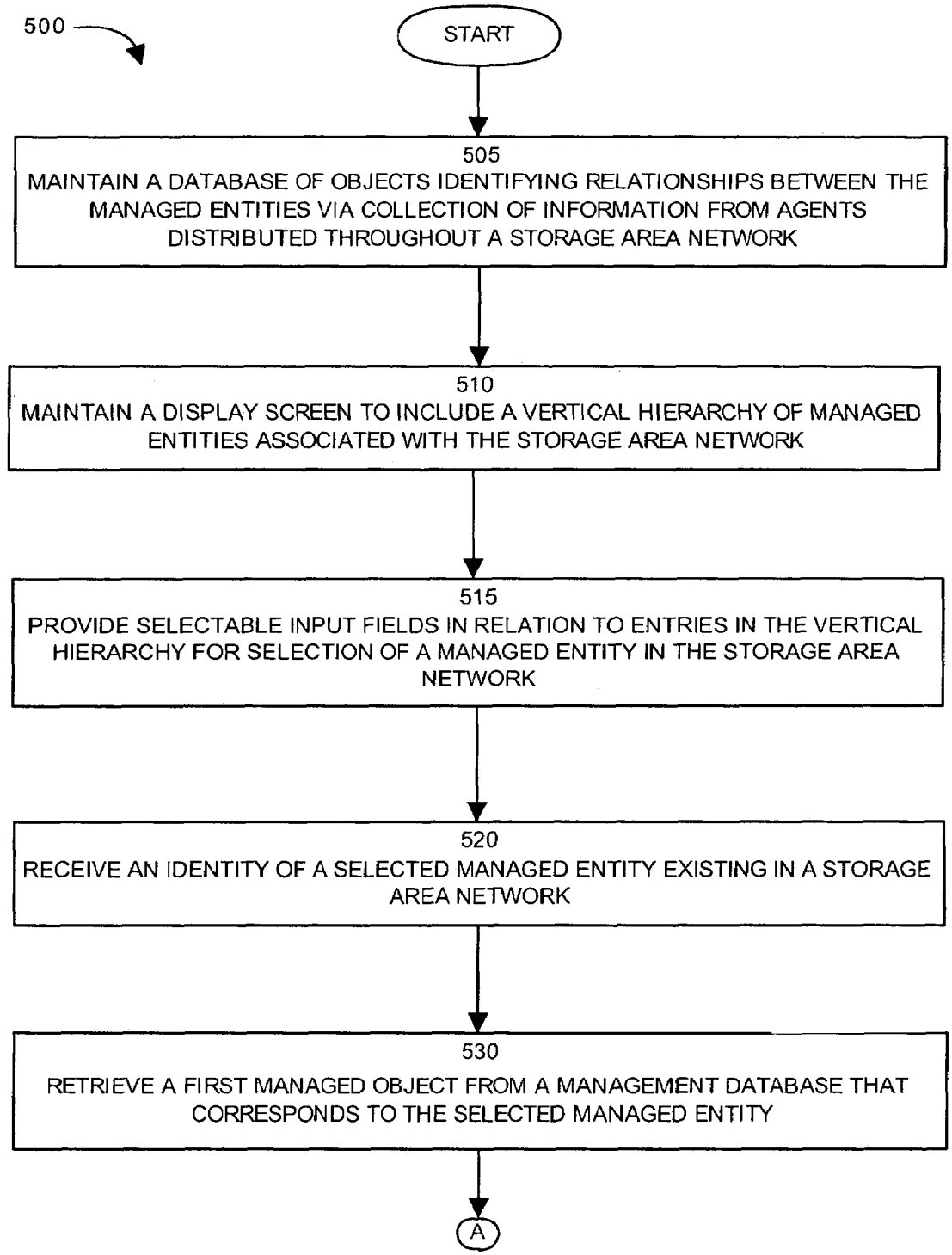
FIGS. 5 and 6 combine to form a flowchart illustrating a more detailed technique for generating a relationship view according to an embodiment of the invention.
Figure 6:
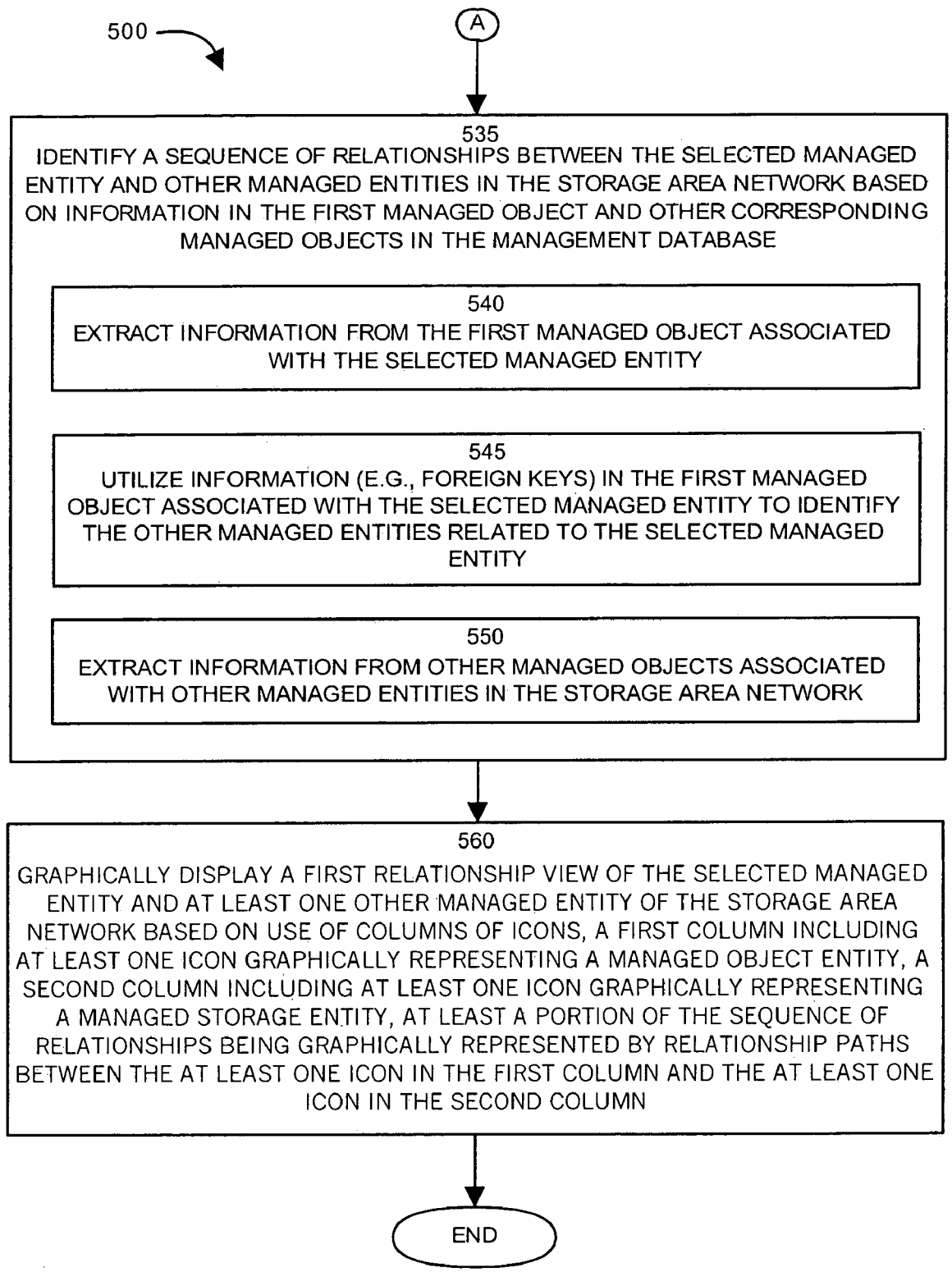

FIGS. 5 and 6 combine to form flowchart 500 illustrating processing steps performed by resource manager 120 in accordance with a more specific example embodiment of the invention. As discussed, resource manager 120 enables user 108 of the management station computer system 110 to display a relationship view 170 of a selected managed entity of network 100 on display 130.

In step 505 of FIG. 5, resource manager 120 (e.g., via processor 113) maintains a management database 125 of managed objects 210 which include references identifying relationships among other managed hardware and software entities. In one application, managed objects 210 are created and stored in response to the collection and processing of information from agents distributed throughout the storage area network 100. For example, according to one embodiment, network 100 includes host agents, storage array agents, database agents, NAS (Network Attached Storage) agents, and the like that collect and forward relationship information (e.g., configuration data, mapping information, etc.) to computer system 110 for maintaining managed objects 210 in database 125. Host agents collect relationship information such as host device information, LVM information, file systems, etc. associated with host devices 104. Storage array agents collect relationship information associated with devices, disks, adapters, ports, etc. associated with storage devices 102. Database agents collect relationship information (e.g., database file to file system or raw device relationships) associated with database such as table spaces, databases, schemas, database files, etc. NAS agents collect relationship information associated with NAS containers, NAS servers, file systems, mount points, etc.

Based on receipt of relationship information from the multiple distributed agents, resource manager 120 updates the management database 125 to reflect relationships among previously existing and newly created hardware and software type managed entities. In other words, when network system 100 is reconfigured resource manager 120 updates database 125 based on receipt of the relationship information from agents to reflect changes in relationships between previous and newly managed entities. As discussed, one purpose of tracking the relationships via managed objects 210 is to support generation of relationship views 170 by resource manager 120. After analyzing managed entities associated with network 100 via relationship view 170, user 108 may reconfigure network 100 to increase its performance. For example, a user 108 may reconfigure network 100 to include additional backup paths for storage of data associated with host device 104 and into storage device 102.

Selection of which managed entity to display in the relationship view 170 depends on input from a user 108 such as a network manager overseeing a corresponding storage area network 100. In step 510, resource manager 120 displays a hierarchical arrangement of icons 160 of corresponding managed entities (e.g., icons associated with databases, file systems, host devices, system information, etc.) to a user 108 on a left side of display screenshot 700 as shown in FIG. 7.

In step 515, resource manager 120 provides one or multiple selectable input checkboxes 418 in relation to entries in the vertical hierarchy 160 on display 130. To select which managed entity to include in a relationship view 170, the user 108 clicks on an appropriate selectable input checkbox 418 disposed in relation to entries 415 of the hierarchical arrangement of icons 160 displayed in screenshot 700. In one application, user 108 selects a managed entity using peripheral device 116 such as a computer mouse device as previously discussed.

In response to receiving selection of a particular entry 415 of a managed entity listed in the hierarchical arrangement of icons 160 in step 520, the resource manager 120 associated with computer system 110 generates a relationship view 170 from the perspective of a corresponding selected managed entity. Note that FIG. 7 illustrates a screenshot 700 prior to selection of a relationship view 170 associated with a managed entity. FIG. 8 illustrates a relationship view 170 after certain icons have been expanded by clicking on corresponding + signs.

After receiving the identity of a selected managed entity (e.g., orasymm file system) in step 520, the resource manager 120 retrieves a managed object 210 from the management database 125 that corresponds to the selected managed entity in step 530. To identify a sequence of relationships between a selected managed entity and other managed entities of network 100 in step 535, the resource manager 120 extracts information (e.g., one or more references such as foreign key attributes) from the retrieved managed object 210 associated with the selected managed entity in step 540 and stores it in a corresponding data structure in memory system 112. Based on further processing in step 545, the resource manager 120 utilizes references in the selected managed object 210 to identify other managed objects 210 (associated with other corresponding managed entities) related to the retrieved managed object 210. Using reference information (e.g., foreign key attributes) associated with the retrieved managed objects 210, the resource manager 120 identifies other managed entities related to the selected managed entity. For example, in step 550, the resource manager 120 also extracts the other managed objects 210 and stores corresponding information in other data structures in memory 112. Based on the information in the data structures, the resource manger 120 identifies a sequence of relationships between the selected managed entity and other managed entities in the storage area network 100. Identification of a sequence of relationships between managed entities (or a portion of the sequence of relationships) in step 535 enables the resource manager 120 to generate and graphically display a relationship view of the selected managed entity and at least one other managed entity of the storage area network 100 in step 560.

More specifically, in step 560, the resource manager 120 generates a horizontally disposed relationship view 170 of adjacently positioned columns each including one or multiple icons and corresponding relationship paths 450 from the perspective of an icon associated with the selected managed entity. For example, in a similar manner as discussed, the right hand portion of screenshot 800 in FIG. 8 illustrates a relationship view 170 after selection of a managed entity (e.g., 'orasymm' file system) associated with host 'losat204' and expansion of storage device 000184600314 icon (e.g., a symmetrix model 8130)

As shown, container 460-1 represents a corresponding host device 104 such as a host server of network 100. Container 460-5 represents a corresponding storage device 102 (e.g., a managed hardware entity such as a symmetrix model 8130 represented by icon 000184600314) associated with network 100. Relationship paths 450 between container 460-1 and container 460-5 provide a visual aid for user to identify corresponding logical relationships between the host device 104 and storage device 102. Icons in the containers 460 identify other managed entities in network 100 related to the selected managed entity. Although the selected managed entity 'orasymm' is not illustrated as an icon in relationship view 170 of screenshot 800, managed entity 'orasymm' is technically related to host device 104 (labeled losat204) corresponding to container 460-1. Expansion of container 460-1 and illustration of selected managed entity 'orasymm' file system will be further discussed with respect to FIG. 9.

Figure 9:
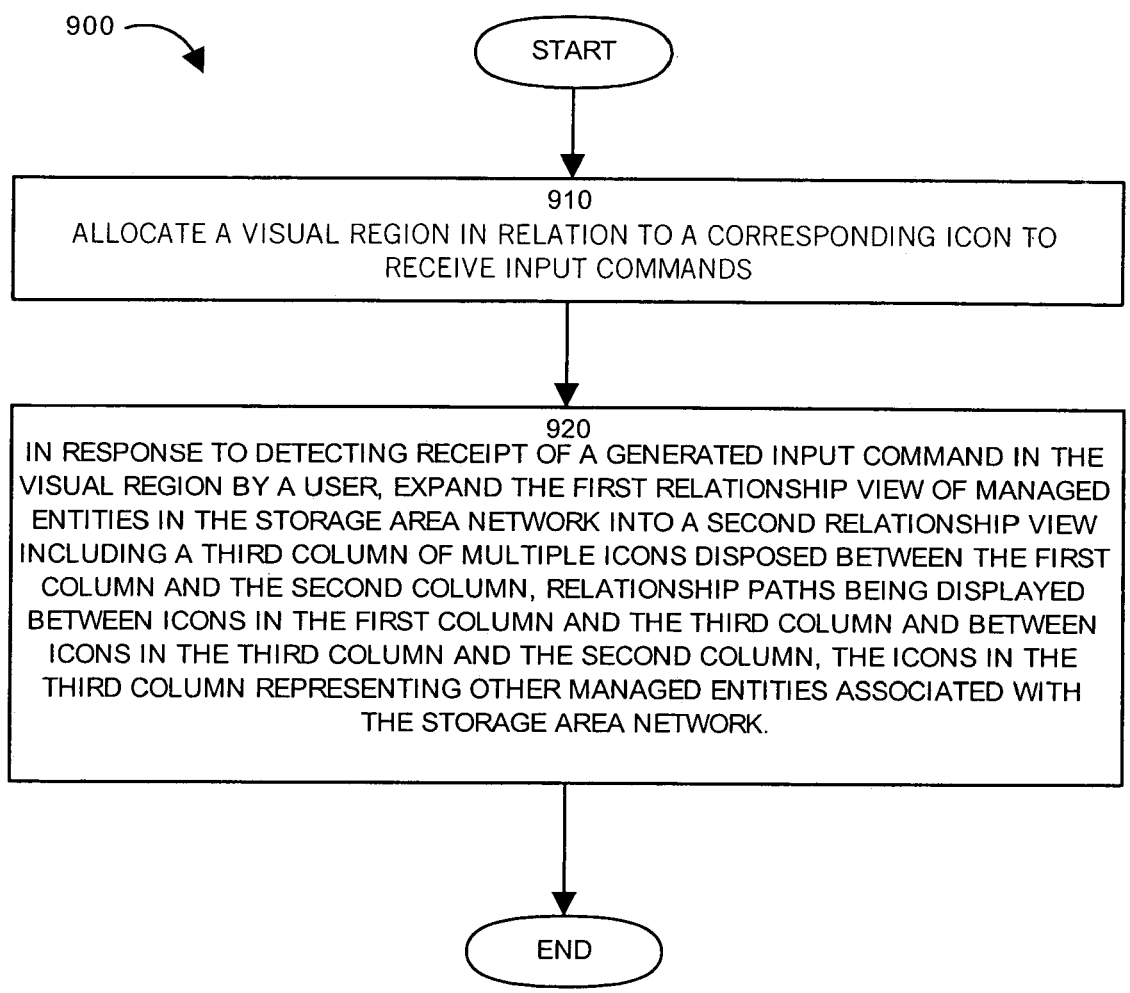
FIG. 9 is a flowchart illustrating a technique for expanding and collapsing icons in a relationship view according to an embodiment of the invention.

FIG. 9 is a flowchart 900 illustrating processing steps performed by resource manager 120 to expand or collapse a relationship view 170 according to an embodiment of the invention. Note that the discussion of flowchart 900 in FIG. 9 will at least occasionally reference screenshot 800 in FIG. 8 and screenshot 1100 in FIG. 11 to illustrate certain embodiments of the invention.

Figure 11:
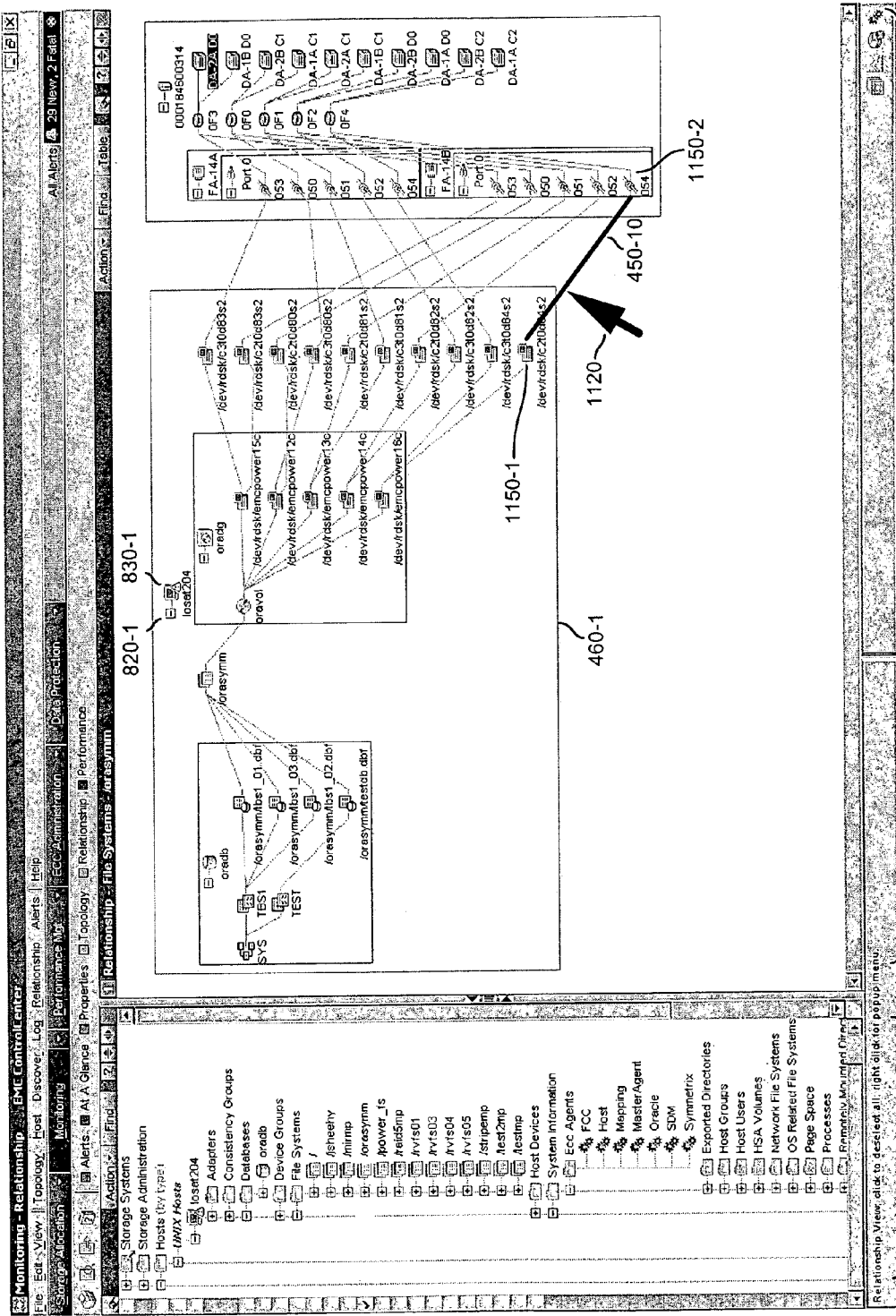
FIG. 11 is a screenshot including a relationship view in which a relationship path selected by the a viewer is highlighted according to an embodiment of the invention.

As discussed above, one display mode supported by an embodiment of the invention enables a viewer to expand or collapse an icon in a corresponding relationship view 170. For example, a display region 820-1 (in FIG. 8) such as a + sign may be allocated in relation to a corresponding icon 830-1 to receive input commands such as 'expand' or 'collapse' in step 910 (of flowchart 900) in FIG. 9. In response to detecting receipt of an 'expand' command from user 108 in step 920 (such as clicking on display region 820-1 near a corresponding icon 830-1), the resource manager 120 expands the first relationship view 170 in FIG. 8 of managed entities in the storage area network 100 into an expanded relationship view 170 as shown in FIG. 11. It should be noted that oradb and oradg icons have also been expanded as shown in screenshot 1100. Thus, if a first relationship view 170 includes a first and second column of icons, an expanded version may include one or more previously hidden additional column of icons representing other managed entities of the storage area network 100.

Conversely, in response to detecting receipt of a 'collapse' command by a user 108 clicking on the display region 820-1 (such as a – sign) near a corresponding icon 830-1 in FIG. 11, the resource manager 120 will collapse contents of container 460-1 in FIG. 11 to merely the contents of container 460-1 and losat204 icon so that at least the selected portion of a relationship view 170 is minimized Accordingly, based on generation of input commands, a user 108 may select a level of relationship details for different managed entities displayed in a relationship view 170.

Figure 10:
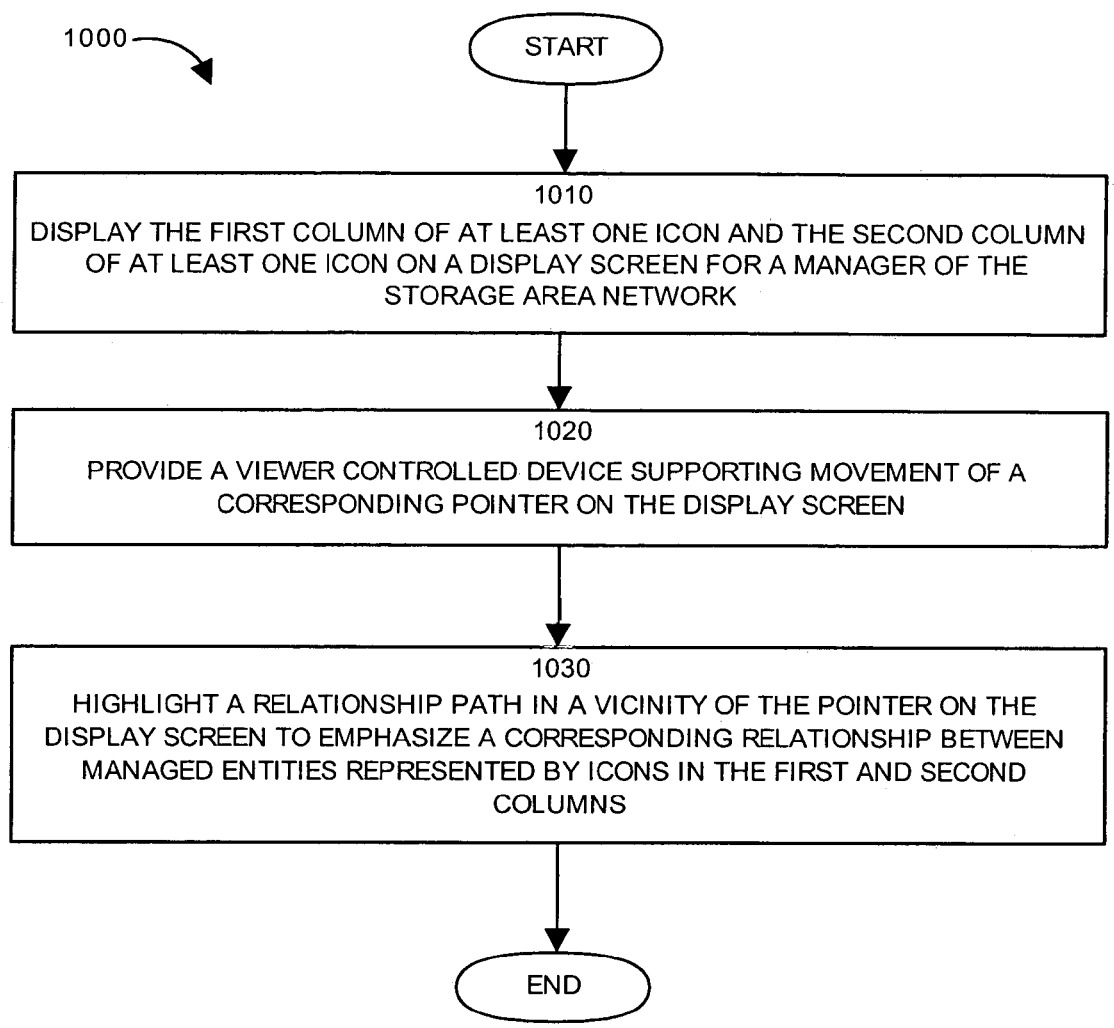
FIG. 10 is a flowchart illustrating a technique for highlighting a relationship path according to an embodiment of the invention.

FIG. 10 is a flowchart 1000 illustrating a technique of highlighting relationship paths 450 according to an embodiment of the present invention. Note that the discussion of flowchart 1000 in FIG. 10 will at least occasionally reference screenshot 1100 in FIG. 11.

More particularly, one display mode associated with a relationship view 1100 in FIG. 11 involves use of a viewer controlled device (e.g., a peripheral device 116 such as a computer mouse) to highlight relationship paths 450 displayed in the relationship view 170. In step 1010 of FIG. 10, resource manager 120 displays relationship view 170 including columns of icons.

In step 1020, a provided viewer controlled device supports movement of a corresponding cursor 1120 (such as an arrow icon) on the display screen 130. In response to detecting that the cursor 1120 is in a vicinity of a given relationship path 450-10 (as selected by the viewer) in step 1030, the resource manager 120 highlights (bolds, changes color, distinguishes, . . . ) the given relationship path 450-10 on the display screen 130. This feature enables a user 108 to easily identify relationships between managed entities or icons 1150-1 and 1150-2 at ends of the highlighted relationship path 450-10. One embodiment of the invention supports a toggle highlighting mode. For example, user 108 may click on a relationship path 450 to highlight it and thereafter de-highlight by clicking the relationship path 450 again. It should be noted that multiple paths may be highlighted simultaneously with the latter highlighting technique. Additionally, other managed entities such as containers 460 and icons may be highlighted in a similar way that relationship paths 450 may be highlighted.

Figure 12:
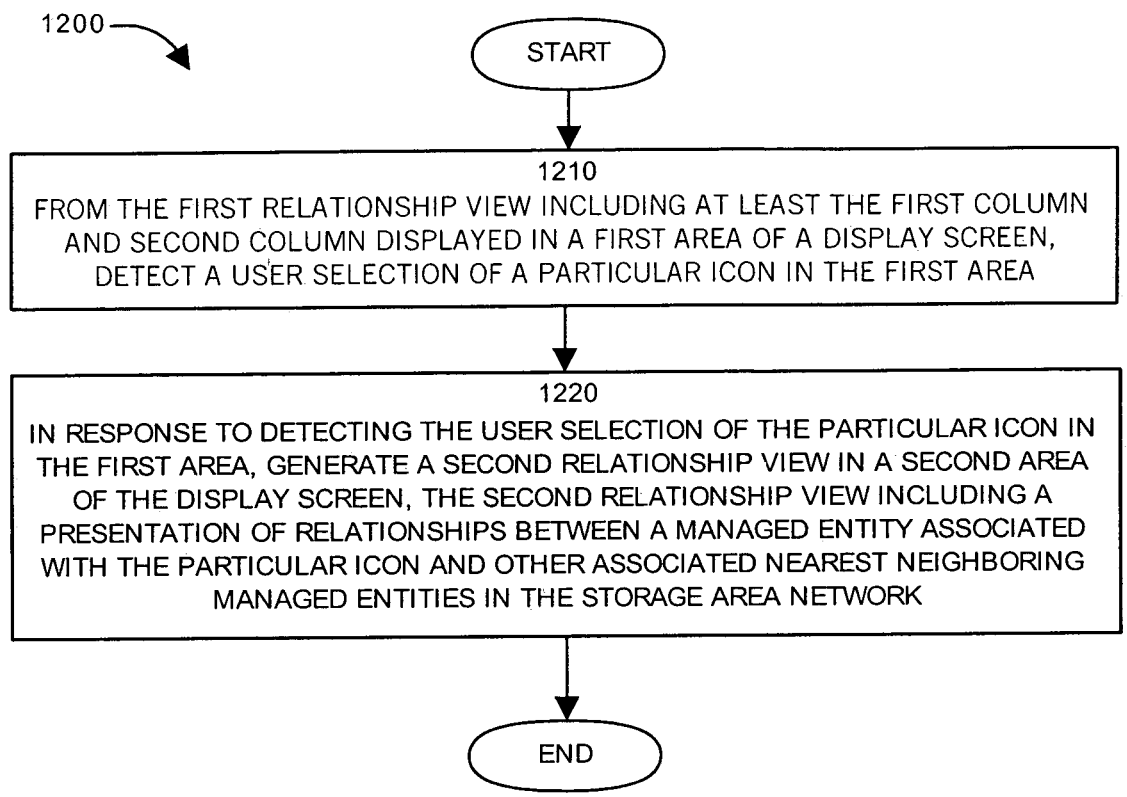
FIG. 12 is a flowchart illustrating a technique for expanding a display screen to include multiple relationship views according to an embodiment of the invention.
Figure 13:
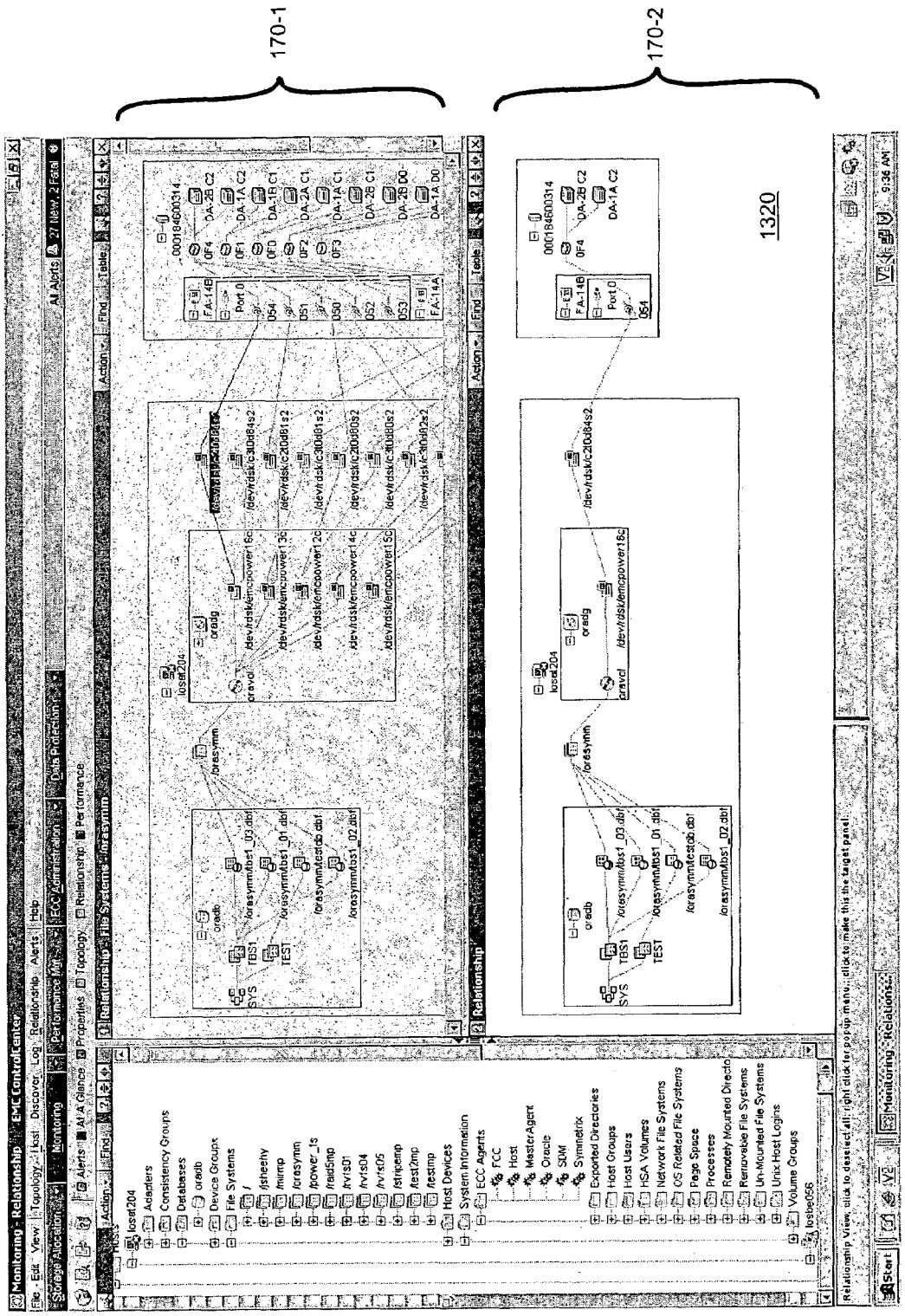
FIG. 13 is a screenshot of a display screen including multiple relationship views according to an embodiment of the invention.

FIG. 12 is a flowchart 1200 illustrating a technique of simultaneously presenting multiple relationship views 170 according to an embodiment of the present invention. Note that the discussion of flowchart 1200 in FIG. 12 will at least occasionally reference screenshot 1300 in FIG. 13.

In step 1210 of FIG. 12, the resource manager 120 displays a first relationship view 170-1 in a corresponding display region of display 130. From the first relationship view 170-1, a user 108 selects a particular icon among many potentially displayed icons and corresponding relationship paths 450. For example, in one embodiment, a user 108 may select a managed entity displayed in the first relationship view 170-1 by dragging and dropping the particular icon into a second area of the display screen 130.

In step 1220, resource manager 120 detects a user 108 is selection of the particular icon (or potentially a group of icons) for providing a corresponding relationship view in the second display area of display 130.

In response to detecting the user's selection of the particular icon in the first area 1310 in step 1220, the processing device generates a second relationship view 170-2 in a second area 1320 of the display screen 130. The second relationship view 170-2 including a presentation of relationships between a managed entity associated with the particular selected icon and other associated nearest neighboring managed entities in the storage area network 100.

For example, according to one embodiment, user 108 initially opens display region 1320 as shown in screenshot 1300. Thereafter, user 108 selects a managed entity (such as highlighted host device icon /dev/rdsk/c2t0d84s2), drags it and drops it in display region 1320. In response, to detecting this user input, resource manager 120 generates second relationship view 170-2 in display region 1320 including any relationship paths 450 and icons related to the dragged and dropped host device icon /dev/rdsk/c2t0d84s2. This feature enables user 108 to more easily view specific relationship details associated with the selected managed entity separate from other more densely packed relationship details shown in first relationship view 170-1.

While this invention has been particularly shown and described with references to preferred embodiments thereof, it will be understood by those skilled in the art that various changes in form and details may be made therein without departing from the spirit and scope of the invention as defined by the appended claims. Such variations are intended to be covered by the scope of this invention. As such, the foregoing description of embodiments of the invention is not intended to be limiting. Rather, any limitations to embodiments of the invention are presented in the following claims.

The invention claimed is:

1. A method of displaying management information associated with a storage area network, the method comprising:
   receiving an identity of a selected managed entity existing in a storage area network;
   retrieving a first managed object from a management database that corresponds to the selected managed entity;
   identifying a sequence of relationships between the selected managed entity and other managed entities in the storage area network based on information in the first managed object and other corresponding managed objects in the management database;
   graphically displaying a first relationship view of the selected managed entity and at least one other managed entity of the storage area network based on use of columns of icons, a first column including at least two icons graphically representing a managed software entity, a second column including at least two icons graphically representing a managed storage entity, at least a portion of the sequence of relationships being graphically represented by relationship paths between icons in the first column and icons in the second column;
   graphically displaying a first container encompassing at least one of the first column of icons and the second column of icons;
   in a separate region from the first column of icons and the second column of icons, initiating display of a particular icon representing a particular storage are network resource;
   initiating display of a relationship path between the particular icon and a given icon in the first column;
   receiving a command to expand a viewing of the particular icon;
   in response to receiving the command, expanding the particular icon to include a third column of icons, the third column of icons including a group of icons representing resources associated with the particular storage area network resource; and
   in lieu of displaying a single relationship path between the particular icon and the given icon in the first column, initiating display of multiple relationship paths between icons in the third column and icons in the first column to illustrate that resources associated with the particular resource in the third column are related to resources represented by icons displayed in the first column.

2. A method as in claim 1 further comprising:
   extracting information from the first managed object associated with the selected managed entity;
   extracting information from other managed objects associated with other managed entities in the storage area network;
   storing the information extracted from the first managed object and the other managed objects in corresponding data structures; and
   based on processing of information in the data structures, generating a horizontally disposed first relationship view of adjacently positioned columns including the first column of at least two icons, the second column of at least two icons, and corresponding relationship paths from the perspective of an icon representing the selected managed entity.

3. A method as in claim 1 further comprising:
   displaying the first column of at least two icons and the second column of at least two icons on a display screen for a manager of the storage area network;
   providing a viewer controlled device supporting movement of a corresponding pointer on the display screen; and
   highlighting a relationship path in a vicinity of the pointer on the display screen to emphasize a corresponding relationship between managed entities represented by icons in the first and second columns.

4. A method as in claim 1 further comprising:
   allocating a visual region in relation to a corresponding icon to receive input commands; and
   in response to detecting receipt of a generated input command in the visual region by a user, expanding the first relationship view of managed entities in the storage area network into an expanded relationship view including a fourth column of multiple icons disposed between the first column and the second column, relationship paths being displayed between icons in the first column and the fourth column and between icons in the fourth column and the second column, the icons in the fourth column representing other previously hidden managed entities associated with the storage area network.

5. A method as in claim 1 further comprising:
   utilizing references in the first managed object associated with the selected managed entity to identify the other managed entities related to the selected managed entity.

6. A method as in claim 1 further comprising:
displaying the first container to represent at least one of the following: a database, file system, a volume, a storage disk.

7. A method as in claim 1, wherein graphically displaying the first relationship view includes:
displaying a second container encompassing at least two of the columns and corresponding icons and the first container.

8. A method as in claim 1 further comprising:
from the first relationship view including at least the first column and second column displayed in a first area of a display screen, detecting a user selection of a specific icon in the first area; and
in response to detecting the user selection of the specific icon in the first area, generating a second relationship view in a second area of the display screen, the second relationship view including a presentation of relationships between a managed entity associated with the specific icon and other associated nearest neighboring managed entities in the storage area network.

9. A method as in claim 8, wherein the second relationship view is generated in response to a viewer dragging and dropping the particular icon from the first area to the second area of the display screen.

10. A method as in claim 8 further comprising:
maintaining the display screen to include a third area to display a vertical hierarchy of managed entities associated with the storage area network;
providing selectable input fields in relation to entries in the vertical hierarchy for selection of a managed entity in the storage area network; and
in response to detecting selection of a particular entry in the vertical hierarchy, generating the first relationship view from the perspective of a corresponding selected managed entity.

11. A method as in claim 1 further comprising:
maintaining a database of objects identifying relationships between the managed entities via collection of information from agents distributed throughout the storage area network.

12. A method as in claim 1 further comprising:
maintaining a display screen to include an area to display a vertical hierarchy of managed entities associated with the storage area network;
providing selectable input fields in relation to entries in the vertical hierarchy for selection of a managed entity in the storage area network; and
in response to detecting selection of a particular entry in the vertical hierarchy, generating the first relationship view from the perspective of a corresponding selected managed entity.

13. A method as in claim 1, wherein the first relationship view identifies a mapping between a file system of a host server and a corresponding storage disk of the storage area network.

14. A method as in claim 1, wherein the first relationship view includes different types of icons, each type of the different type of icons being represented by a corresponding symbol that identifies a type of managed entity associated with the storage area network.

15. A method as in claim 1 further supporting operations of:
in addition to expanding the particular icon to include the third column of icons, initiating display of a second container to encompass the particular icon as well as the third column of icons, the second container illustrating that the third column of icons represents storage area network resources associated with the particular resource represented by the particular icon.

16. A method as in claim 1, wherein graphically displaying the first container includes encompassing the first column of icons with the first container, the method further comprising:
graphically displaying a second container to encompass the second column of icons; and
graphically displaying a third container to encompass both the first container and the second container to illustrate that the first column of icons and the second claim of icons are part of a storage area network resource represented by the third container.

17. A method for displaying management information associated with a storage area network, the method comprising:
displaying multiple icons representing corresponding managed entities in the storage area network, the multiple icons including at least one software icon associated with a managed software entity and at least one hardware icon associated with a managed hardware entity;
displaying the at least one software icon in a first column of icons;
displaying the at least one hardware icon in a second column of icons, the first column being disposed adjacent to the second column;
displaying associations among the managed entities via relationship paths between the icons of the first column and icons of the second column;
in a separate region from the first column of icons and the second column of icons, initiating display of a particular icon representing a particular storage are network resource;
initiating display of a relationship path between the particular icon and a given icon in the first column;
receiving a command to expand a viewing of the particular icon;
in response to receiving the command, expanding the particular icon to include a third column of icons, the third column of icons including a group of icons representing resources associated with the particular storage area network resource; and
in lieu of displaying a single relationship path between the particular icon and the given icon in the first column, initiating display of multiple relationship paths between icons in the third column and icons in the first column to illustrate that resources associated with the particular resource in the third column are related to resources represented by icons displayed in the first column.

18. A method as in claim 17 further comprising:
in relation to a first icon of the multiple icons, maintaining a visual region associated with the first icon to receive input commands from a user indicating to expand and display hidden attributes associated with a corresponding managed entity associated with the first icon.

19. A method as in claim 18 further comprising:
in response to detecting an input command signal received in the visual region, displaying an expanded relationship view of managed entities associated with the first icon, the expanded relationship view including: i) additional icons associated with other managed entities in the storage area network, and ii) additional relationship paths between the additional icons and other previously displayed icons.

20. A method as in claim 19 further comprising:
displaying a graphical container encompassing the first icon and the expanded relationship view of the managed entity associated with the first icon to indicate that the additional icons and corresponding managed entities are related to the first icon and corresponding managed entity.

21. A method as in claim 17 further comprising:
displaying nested graphical containers encompassing different sets of icons to delineate corresponding functional components associated with a host server of the storage area network.

22. A method as in claim 17 further comprising:
displaying a first graphical container encompassing icons representing managed entities associated with a first resource of the storage area network;
displaying a second graphical container encompassing icons representing managed entities associated with a second resource of the storage area network; and
displaying relationship paths between icons in the first graphical container and icons in the second graphical container to indicate a relationship mapping between the first resource and the second resource.

23. A method as in claim 17, wherein a first icon of the multiple icons identifies a file system and a second icon of the multiple icons identifies at least part of a storage device, and wherein relationship paths between the first icon and second icon identify a mapping between the file system and storage device.

24. A method as in claim 17, wherein displaying the at least one hardware icon in the second column includes displaying multiple hardware icons in the second column; and
wherein displaying associations includes providing multiple relationship paths between the at least one software icon in the first column and each of the multiple hardware icons in the second column to indicate where data represented by the at least one software icon in the first column is stored in corresponding hardware devices which are represented by the multiple hardware icons in the second column.

25. A method as in claim 17, wherein displaying the at least one software icon in the first column includes displaying multiple software managed entities as respective software icons in the first column;
wherein displaying the at least one hardware icon in the second column includes displaying multiple hardware managed entities as respective hardware icons in the second column; and
wherein displaying associations includes providing at least two horizontal relationship paths between the respective software icons in the first column and the respective hardware icons in the second column.

26. A method as in claim 25, wherein displaying the associations includes:
displaying a first relationship path of the at least two relationship paths from a first software icon in the first column to a first hardware icon in the second column; and
displaying a second relationship path of the at least two relationship paths from a second software icon in the first column to a second hardware icon in the second column.

27. A method as in claim 24, wherein displaying multiple hardware icons in the second column includes displaying similar types of corresponding symbols in the second column to indicate that the corresponding hardware devices are of the same type.

28. A method as in claim 27 further comprising:
displaying unique identification information associated with the at least one software icon in the first column; and
displaying unique identification information associated with each of the multiple hardware icons in the second column.

29. A computer system for supporting relationship views associated with a storage area network, the computer system comprising:
a processor;
a memory unit that stores instructions associated with an application executed by the processor;
a communication interface that supports communication with other nodes of the storage area network; and
an interconnect coupling the processor, the memory unit, and the communication interface, enabling the computer system to execute the application and perform operations of:
receiving an identity of a selected managed entity existing in a storage area network;
retrieving a first managed object from a management database that corresponds to the selected managed entity;
identifying a sequence of relationships between the selected managed entity and other managed entities in the storage area network based on information in the first managed object and other corresponding managed objects in the management database;
graphically displaying a first relationship view of the selected managed entity and at least one other managed entity of the storage area network based on use of columns of icons, a first column including at least one icon graphically representing a managed software entity, a second column including at least one icon graphically representing a managed storage entity, at least a portion of the sequence of relationships being graphically represented by relationship paths between the at least one icon in the first column and the at least one icon in the second column;
in a separate region from the first column of icons and the second column of icons, initiating display of a particular icon representing a particular storage area network resource;
initiating display of a relationship path between the particular icon and a given icon in the first column;
receiving a command to expand a viewing of the particular icon;
in response to receiving the command, expanding the particular icon to include a third column of icons, the third column of icons including a group of icons representing resources associated with the particular storage area network resource; and
in lieu of displaying a single relationship path between the particular icon and the given icon in the first column, initiating display of multiple relationship paths between icons in the third column and icons in the first column to illustrate that resources associated with the particular resource in the third column are related to resources represented by icons displayed in the first column.

30. A computer system as in claim 29 that additionally performs operations of:
extracting information from the first managed object associated with the selected managed entity;

extracting information from other managed objects associated with other managed entities in the storage area network;

storing the information extracted from the first managed object and the other managed objects in corresponding data structures; and based on processing of information in the data structures, generating a horizontally disposed first relationship view of adjacently positioned columns including the first column of at least one icon, the second column of at least one icons, and corresponding relationship paths from the perspective of an icon representing the selected managed entity.

31. A computer system as in claim 29 that additionally performs operations of:

displaying the first column of at least one icon and the second column of at least one icon on a display screen for a manager of the storage area network;

providing a viewer controlled device supporting movement of a corresponding pointer on the display screen; and highlighting a relationship path in a vicinity of the pointer on the display screen to emphasize a corresponding relationship between managed entities represented by icons in the first and second columns.

32. A computer system as in claim 29 that additionally performs operations of:

allocating a visual region in relation to a corresponding icon to receive input commands; and in response to detecting receipt of a generated input command in the visual region by a user, expanding the first relationship view of managed entities in the storage area network into an expanded relationship view including a fourth column of multiple icons disposed between the first column and the second column, relationship paths being displayed between icons in the first column and the fourth column and between icons in the fourth column and the second column, the icons in the fourth column representing other previously hidden managed entities associated with the storage area network.

33. A computer system as in claim 29 that additionally performs operations of:

utilizing references in the first managed object associated with the selected managed entity to identify the other managed entities related to the selected managed entity.

34. A computer system as in claim 29 that additionally performs operations of:

displaying a first container encompassing at least one of the columns and corresponding icons to represent at least one of the following: a database, a file system, a volume, a host server, a storage disk.

35. A method as in claim 29, wherein graphically displaying the first relationship view includes:

displaying a first container encompassing at least one of the columns and corresponding icons; and displaying a second container encompassing at least two of the columns and corresponding icons and the first container.

36. A computer system as in claim 29 that additionally performs operations of:

from the first relationship view including at least the first column and second column displayed in a first area of a display screen, detecting a user selection of a specific icon in the first area; and in response to detecting the user selection of the specific icon in the first area, generating a second relationship view in a second area of the display screen, the second relationship view including a presentation of relationships between a managed entity associated with the specific icon and other associated nearest neighboring managed entities in the storage area network.

37. A computer system as in claim 36, wherein the second relationship view is generated in response to a viewer dragging and dropping the particular icon from the first area to the second area of the display screen.

38. A computer system as in claim 36 that additionally performs operations of:

maintaining the display screen to include a third area to display a vertical hierarchy of managed entities associated with the storage area network;

providing selectable input fields in relation to entries in the vertical hierarchy for selection of a managed entity in the storage area network; and in response to detecting selection of a particular entry in the vertical hierarchy, generating the first relationship view from the perspective of a corresponding selected managed entity.

39. A computer system as in claim 29 that additionally performs operations of:

maintaining a database of objects identifying relationships between the managed entities via collection of information from agents distributed throughout the storage area network.

40. A computer system as in claim 29 that additionally performs operations of:

maintaining a display screen to include an area to display a vertical hierarchy of managed entities associated with the storage area network;

providing selectable input fields in relation to entries in the vertical hierarchy for selection of a managed entity in the storage area network; and in response to detecting selection of a particular entry in the vertical hierarchy, generating the first relationship view from the perspective of a corresponding selected managed entity.

41. A computer system as in claim 29, wherein the first relationship view identifies a mapping between a file system of a host server and a corresponding storage disk of the storage area network.

42. A computer system as in claim 29, wherein the first relationship view includes different types of icons, each type of the different type of icons being represented by a corresponding symbol that identifies a type of managed entity associated with the storage area network.

43. A computer system for displaying relationship views associated with a storage area network, the computer system comprising:

a processor;

a memory unit that stores instructions associated with an application executed by the processor;

a communication interface that supports communication with nodes of the storage area network; and an interconnect coupling the processor, the memory unit, and the communication interface, enabling the computer system to execute the application and perform operations of:

displaying multiple icons representing corresponding managed entities in the storage area network, the multiple icons including at least one software icon associated with a managed software entity and at least one hardware icon associated with a managed hardware entity;

displaying the at least one software icon in a first column;

displaying the at least one hardware icon in a second column, the first column being disposed adjacent to the second column;

displaying associations among the managed entities via relationship paths between the icons of the first column and icons of the second column in a separate region from the first column of icons and the second column of icons, initiating display of a particular icon representing a particular storage area network resource;

initiating display of a relationship path between the particular icon and a given icon in the first column;

receiving a command to expand a viewing of the particular icon;

in response to receiving the command, expanding the particular icon to include a third column of icons, the third column of icons including a group of icons representing resources associated with the particular storage area network resource; and in lieu of displaying a single relationship path between the particular icon and the given icon in the first column, initiating display of multiple relationship paths between icons in the third column and icons in the first column to illustrate that resources associated with the particular resource in the third column are related to resources represented by icons displayed in the first column.

44. A computer system as in claim 43 that additionally performs operations of:

in relation to a first icon of the multiple icons, maintaining a visual region associated with the first icon to receive input commands from a user indicating to expand and display hidden attributes associated with a corresponding managed entity associated with the first icon.

45. A computer system as in claim 44 that additionally performs operations of:

in response to detecting an input command signal received in the visual region, displaying an expanded relationship view of managed entities associated with the first icon, the expanded relationship view including: i) additional icons associated with other managed entities in the storage area network, and ii) additional relationship paths between the additional icons and other previously displayed icons.

46. A computer system as in claim 45 that additionally performs operations of:

displaying a graphical container encompassing the first icon and the expanded relationship view of the managed entity associated with the first icon to indicate that the additional icons and corresponding managed entities are related to the first icon and corresponding managed entity.

47. A computer system as in claim 43 that additionally performs operations of:

displaying nested graphical containers encompassing different sets of icons to delineate corresponding functional components associated with a host server of the storage area network.

48. A computer system as in claim 43 that additionally performs operations of:

displaying a first graphical container encompassing icons representing managed entities associated with a host server of the storage area network;

displaying a second graphical container encompassing icons representing managed entities associated with a storage device of the storage area network; and displaying relationship paths between icons in the first graphical container and icons in the second graphical container to indicate a device mapping between the host server and the storage device.

49. A computer system as in claim 43, wherein a first icon of the multiple icons identifies a file system and a second icon of the multiple icons identifies at least part of a storage device, and relationship paths between the first icon and second icon identify a mapping between the file system and storage device.

50. A method of displaying management information associated with a storage area network, the method comprising:

receiving an identity of a selected managed entity existing in a storage area network;

retrieving a first managed object from a management database that corresponds to the selected managed entity;

identifying a sequence of relationships between the selected managed entity and other managed entities in the storage area network based on information in the first managed object and other corresponding managed objects in the management database; and graphically displaying a first relationship view of the selected managed entity and at least one other managed entity of the storage area network based on use of adjacent columns of icons, a first column including at least one icon graphically representing a managed software entity, a second column including at least two icons graphically representing managed entities, a third column of at least two icons graphically representing managed storage entities, the sequence of relationships being graphically represented by at least some diagonal relationship paths between the at least one icon in the first column, the at least two icons in the second column, and the at least two icons in the third column in a separate region from the first column of icons and the second column of icons, initiating display of a particular icon representing a particular storage area network resource;

initiating display of a relationship path between the particular icon and a given icon in the first column;

receiving a command to expand a viewing of the particular icon;

in response to receiving the command, expanding the particular icon to include a third column of icons, the third column of icons including a group of icons representing resources associated with the particular storage area network resource; and in lieu of displaying a single relationship path between the particular icon and the given icon in the first column, initiating display of multiple relationship paths between icons in the third column and icons in the first column to illustrate that resources associated with the particular resource in the third column are related to resources represented by icons displayed in the first column.

51. A method as in claim 50 further comprising:

graphically displaying a first container encompassing the first column to identify a host server of the storage area network; and graphically displaying a second container encompassing at least the third column to identify a storage device.

52. A computer program product including a computer-readable medium having instructions stored thereon for processing data information, such that the instructions, when carried out by a processing device, enable the processing device to perform the steps of:

receiving an identity of a selected managed entity existing in a storage area network;

retrieving a first managed object from a management database that corresponds to the selected managed entity;

identifying a sequence of relationships between the selected managed entity and other managed entities in the storage area network based on information in the first managed object and other corresponding managed objects in the management database; and graphically displaying a first relationship view of the selected managed entity and at least one other managed entity of the storage area network based on use of columns of icons, a first column including at least one icon graphically representing a managed software entity, a second column including at least one icon graphically representing a managed storage entity, at least a portion of the sequence of relationships being graphically represented by relationship paths between the at least one icon in the first column and the at least one icon in the second column;

in a separate region from the first column of icons and the second column of icons, initiating display of a particular icon representing a particular storage area network resource;

initiating display of a relationship path between the particular icon and a given icon in the first column;

receiving a command to expand a viewing of the particular icon;

in response to receiving the command, expanding the particular icon to include a third column of icons, the third column of icons including a group of icons representing resources associated with the particular storage area network resource; and in lieu of displaying a single relationship path between the particular icon and the given icon in the first column, initiating display of multiple relationship paths between icons in the third column and icons in the first column to illustrate that resources associated with the particular resource in the third column are related to resources represented by icons displayed in the first column.

53. A computer system for supporting relationship views associated with a storage area network, the computer system including:

means for receiving an identity of a selected managed entity existing in a storage area network;

means for retrieving a first managed object from a management database that corresponds to the selected managed entity;

means for identifying a sequence of relationships between the selected managed entity and other managed entities in the storage area network based on information in the first managed object and other corresponding managed objects in the management database; and means for graphically displaying a first relationship view of the selected managed entity and at least one other managed entity of the storage area network based on use of columns of icons, a first column including at least one icon graphically representing a managed software entity, a second column including at least one icon graphically representing a managed storage entity, at least a portion of the sequence of relationships being graphically represented by relationship paths between the at least one icon in the first column and the at least one icon in the second column;

means for initiating display of a particular icon representing a particular storage area network resource in a separate region from the first column of icons and the second column of icons;

means for initiating display of a relationship path between the particular icon and a given icon in the first column;

means for receiving a command to expand a viewing of the particular icon;

means for expanding the particular icon to include a third column of icons in response to receiving the command, the third column of icons including a group of icons representing resources associated with the particular storage area network resource; and means for initiating display of multiple relationship paths between icons in the third column and icons in the first column to illustrate that resources associated with the particular resource in the third column are related to resources represented by icons displayed in the first column in lieu of displaying a single relationship path between the particular icon and the given icon in the first column.

* * * * *